United States Patent
Kim

(10) Patent No.: US 9,258,539 B2
(45) Date of Patent: Feb. 9, 2016

(54) METHOD OF CALIBRATING AUTOMATIC WHITE BALANCE AND IMAGE CAPTURING DEVICE PERFORMING THE SAME

(71) Applicant: SAMSUNG ELECTRONICS CO., LTD., Suwon-si (KR)

(72) Inventor: Byoung-Il Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/514,443

(22) Filed: Oct. 15, 2014

(65) Prior Publication Data

US 2015/0116534 A1 Apr. 30, 2015

(30) Foreign Application Priority Data

Oct. 24, 2013 (KR) ......................... 10-2013-0126941

(51) Int. Cl.
*H04N 9/73* (2006.01)
*H04N 9/09* (2006.01)
*H04N 1/60* (2006.01)
*H04N 9/04* (2006.01)

(52) U.S. Cl.
CPC ............ *H04N 9/735* (2013.01); *H04N 1/6027* (2013.01); *H04N 1/6086* (2013.01); *H04N 9/045* (2013.01); *H04N 9/09* (2013.01)

(58) Field of Classification Search
CPC ... H04N 9/735; H04N 1/6027; H04N 1/6086; H04N 9/09; H04N 9/045; H04N 2209/046; H04N 5/23229; H04N 9/73
See application file for complete search history.

(56) References Cited

U.S. PATENT DOCUMENTS

| | | | |
|---|---|---|---|
| 4,739,392 A | 4/1988 | Ueda et al. | |
| 4,739,393 A | 4/1988 | Seki et al. | |
| 5,099,313 A | 3/1992 | Suemoto et al. | |
| 7,148,921 B2 | 12/2006 | Ikeda et al. | |
| 2007/0139529 A1 | 6/2007 | Levien et al. | |
| 2008/0024596 A1 | 1/2008 | Li et al. | |
| 2010/0149372 A1* | 6/2010 | Silverstein | H04N 5/2258 348/223.1 |
| 2010/0194918 A1 | 8/2010 | Zhang et al. | |
| 2013/0057725 A1* | 3/2013 | Takayama | H04N 9/643 348/223.1 |
| 2013/0083216 A1 | 4/2013 | Jiang et al. | |
| 2014/0168463 A1* | 6/2014 | Tamura | H04N 9/735 348/223.1 |

FOREIGN PATENT DOCUMENTS

| | | |
|---|---|---|
| JP | 2003-333616 A | 11/2003 |
| JP | 2004-187147 A | 7/2004 |

(Continued)

*Primary Examiner* — Aung S Moe
(74) *Attorney, Agent, or Firm* — Sughrue Mion, PLLC

(57) ABSTRACT

An image capture device and a method of calibrating automatic white balance thereof are provided. The method includes generating first and second frame data using first and second image sensors, respectively, in response to incident light; generating first and second color temperature estimation information based on the first frame data and the second frame data, respectively; determining whether an amount of the first color temperature estimation information is sufficient to estimate a color temperature of a light source; estimating the color temperature of the light source based on the first color temperature estimation information when the amount of the first color temperature estimation information is sufficient; and when the amount of the first color temperature estimation information is insufficient estimating the color temperature of the light source based on the first and second color temperature estimation information; and adjusting the first frame data based on the estimated color temperature.

20 Claims, 16 Drawing Sheets

(56) References Cited

FOREIGN PATENT DOCUMENTS

| JP | 2006-33159 A | 2/2006 |
| JP | 2010-4464 A | 1/2010 |
| KR | 10-0765251 B1 | 10/2007 |
| KR | 10-2013-0036702 A | 4/2013 |

* cited by examiner

METHOD OF CALIBRATING AUTOMATIC WHITE BALANCE AND IMAGE CAPTURING DEVICE PERFORMING THE SAME

CROSS-REFERENCE TO RELATED APPLICATION(S)

This application claims priority from Korean Patent Application No. 10-2013-0126941, filed on Oct. 24, 2013 in the Korean Intellectual Property Office, the contents of which are herein incorporated by reference in their entirety.

BACKGROUND

1. Technical Field

Methods, apparatuses and systems consistent with exemplary embodiments relate to an image capturing device, and more particularly, to a method of calibrating automatic white balance (AWB) in an image capturing device and an image capturing device performing the method.

2. Description of the Related Art

In a general image capturing device including image sensors, devices for calibrating automatic white balance (AWB) are coupled to respective image sensors, and each device calibrates an AWB of image data generated from a respective image sensor based on the image data.

The performance of calibrating AWB may be degraded when information for estimating a color temperature of a light source is insufficiently included in the image data generated from each of the image sensors.

SUMMARY

One or more exemplary embodiments provide a method of effectively calibrating automatic white balance (AWB) in an image capturing device including a plurality of image sensors.

One or more exemplary embodiments also provide an image capturing device that performs the method of calibrating AWB.

According to an aspect of an exemplary embodiment, there is provided a method of calibrating automatic white balance in an image capturing device including a first image sensor and a second image sensor, the method including: generating first frame data and second frame data using the first image sensor and the second image sensor, respectively, in response to incident light while each of the first image sensor and the second image sensor is turned on; generating first color temperature estimation information and second color temperature estimation information based on the first frame data and the second frame data, respectively; determining whether an amount of the first color temperature estimation information is sufficient to estimate a color temperature of a light source; estimating the color temperature of the light source based on the first color temperature estimation information in response to determining that the amount of the first color temperature estimation information is determined to be sufficient; estimating the color temperature of the light source based on the first color temperature estimation information and the second color temperature estimation information in response to determining that the amount of the first color temperature estimation information is determined to be insufficient; and adjusting the first frame data based on the estimated color temperature.

The estimating the color temperature of the light source based on the first color temperature estimation information and the second color temperature estimation information in response to determining that the amount of the first color temperature estimation information is insufficient may include determining whether the second image sensor is turned on and turning on the second image sensor in response to determining that the second image sensor is turned off.

The estimating the color temperature of the light source based on the first color temperature estimation information and the second color temperature estimation information in response to determining that the amount of the first color temperature estimation information is insufficient may further include determining whether an amount of the second color temperature estimation information is sufficient to estimate the color temperature of the light source, estimating the color temperature of the light source based on the second color temperature estimation information in response to determining that the amount of the second color temperature estimation information is sufficient, and estimating the color temperature of the light source based on the first color temperature estimation information in response to determining that the amount of the second color temperature estimation information is insufficient.

The estimating the color temperature of the light source based on the first color temperature estimation information in response to determining that the amount of the first color temperature estimation information is sufficient may include determining whether the second image sensor is turned on and estimating the color temperature of the light source based on the first color temperature estimation information in response to determining that the second image sensor is turned off.

The estimating the color temperature of the light source based on the first color temperature estimation information in response to determining that the amount of the first color temperature estimation information is sufficient may further include determining whether an amount of the second color temperature estimation information is sufficient to estimate the color temperature of the light source in response to determining that the second image sensor is turned on, estimating the color temperature of the light source based on the first color temperature estimation information and the second color temperature estimation information in response to determining that the amount of the second color temperature estimation information is sufficient, and estimating the color temperature of the light source based on the first color temperature estimation information in response to determining that the amount of the second color temperature estimation information is insufficient.

The estimating the color temperature of the light source based on the first color temperature estimation information and the second color temperature estimation information in response to determining that the amount of the second color temperature estimation information is sufficient may include generating a first color temperature estimation value by estimating the color temperature of the light source based on the first color temperature estimation information, generating a second color temperature estimation value by estimating the color temperature of the light source based on the second color temperature estimation information, and estimating the color temperature of the light source based on the first color temperature estimation value and the second color temperature estimation value.

The estimating the color temperature of the light source based on the first color temperature estimation value and the second color temperature estimation value may include generating a first weight value and a second weight value that are proportional to the amount of the first color temperature estimation information and the amount of the second color temperature estimation information, respectively, calculating a weighted average value of the first color temperature estimation value and the second color temperature estimation value using the first weight value and the second weight value, and estimating the color temperature of the light source based on the weighted average value.

The estimating the color temperature of the light source based on the first color temperature estimation value and the second color temperature estimation value may include estimating the color temperature of the light source based on the first color temperature estimation value in response to determining that a difference between the first color temperature estimation value and the second color temperature estimation value is greater than a threshold value.

The generating the first color temperature estimation information based on the first frame data may include dividing a frame area corresponding to the first frame data into a plurality of sub-areas; generating a pair of a first average value and a second average value for each of the plurality of sub-areas, the first average value corresponding to an average of red pixel data included in a respective sub-area, the second average value corresponding to an average of blue pixel data included in the respective sub-area; and determining pairs that are included in a predetermined range from among the generated pairs as the first color temperature estimation information.

The determining whether the amount of the first color temperature estimation information is sufficient to estimate the color temperature of the light source may include determining whether a ratio of a number of the determined pairs to a total number of the plurality of sub-areas is greater than a threshold ratio.

The estimating the color temperature of the light source based on the first color temperature estimation information in response to determining that the amount of the first color temperature estimation information is sufficient may include calculating a red average value, which corresponds to an arithmetic average of the first average values included in the first color temperature estimation information, and a blue average value, which corresponds to an arithmetic average of the second average values included in the first color temperature estimation information, and outputting a pair of the red average value and the blue average value as a color temperature data corresponding to the estimated color temperature.

The adjusting the first frame data based on the estimated color temperature may include calculating a red gain, a green gain and a blue gain based on the color temperature data, and generating an adjusted frame data by multiplying the red gain, the green gain and the blue gain by red pixel data, green pixel data and blue pixel data, respectively, included in the first frame data.

The generating the red gain, the green gain and the blue gain based on the color temperature data may include determining a ratio of a sum of the red average value and the blue average value to the red average value as the red gain, determining a ratio of a sum of the red average value and the blue average value to the blue average value as the blue gain, and determining a unit gain as the green gain.

According to an aspect of another exemplary embodiment, there is provided a method of capturing image in an electronic system, the method including: generating first frame data and second frame data using the first image sensor and the second image sensor, respectively, in response to incident light while each of the first image sensor and the second image sensor is turned on; generating first color temperature estimation information and second color temperature estimation information based on the first frame data and the second frame data, respectively; determining whether an amount of the first color temperature estimation information is sufficient to estimate a color temperature of a light source; estimating the color temperature of the light source based on the first color temperature estimation information in response to determining that the amount of the first color temperature estimation information is determined to be sufficient; estimating the color temperature of the light source based on the first color temperature estimation information and the second color temperature estimation information in response to determining that the amount of the first color temperature estimation information is determined to be insufficient; generating adjusted frame data by adjusting the first frame data based on the estimated color temperature; and storing the adjusted frame data in the storage device.

BRIEF DESCRIPTION OF THE DRAWINGS

Illustrative, non-limiting exemplary embodiments will be more clearly understood from the following detailed description in conjunction with the accompanying drawings, in which.

DETAILED DESCRIPTION

Figure 1:
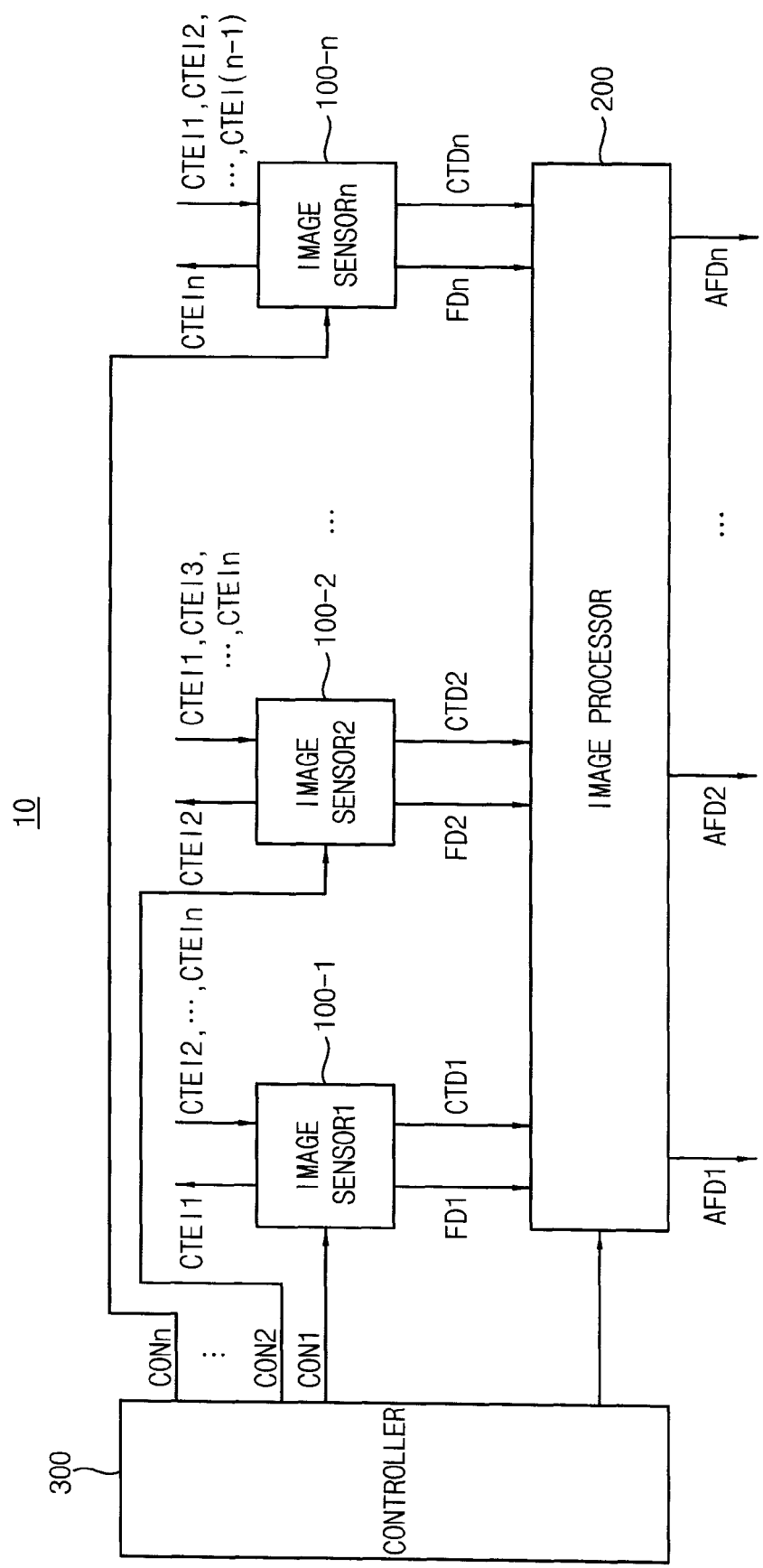
FIG. 1 is a block diagram illustrating an image capturing device according to some exemplary embodiments.

Various exemplary embodiments will be described more fully with reference to the accompanying drawings, in which some exemplary embodiments are shown. The present inventive concept may, however, be embodied in many different forms and should not be construed as limited to the exemplary embodiments set forth herein. Rather, these exemplary embodiments are provided so that this disclosure will be thorough and complete, and will fully convey the scope of the present inventive concept to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular exemplary embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, operations, operations, elements, and/or components, but do not preclude the presence or addition of one or more other features, integers, operations, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating an image capturing device according to some exemplary embodiments.

Referring to FIG. 1, an image capturing device 10 includes first through n-th image sensors 100-1, 100-2, ..., 100-n, an image processor 200 and a controller 300. Here, n represents an integer equal to or greater than two.

The controller 300 controls operations of the first through n-th image sensors 100-1, 100-2, ..., 100-n, and the image processor 200. For example, the first through n-th image sensors 100-1, 100-2, ..., 100-n may be turned on in response to first through n-th control signals CON1, CON2, ..., CONn, respectively, from the controller 300.

The first through n-th image sensors 100-1, 100-2, ..., 100-n generate first through n-th frame data FD1, FD2, ..., FDn, respectively, in response to incident light while each of the first through n-th image sensors 100-1, 100-2, ..., 100-n is turned on in response to the first through n-th control signals CON1, CON2, ..., CONn, respectively. For example, a k-th image sensor 100-k may generate k-th frame data FDk in response to the incident light while the k-th image sensor 100-k is turned on in response to the k-th control signal CONk. Here, k represents a positive integer equal to or smaller than n. Each of the first through n-th frame data FD1, FD2, ..., FDn may include a plurality of pixel data corresponding to one frame.

The first through n-th image sensors 100-1, 100-2, ..., 100-n generate first through n-th color temperature estimation information CTEI1, CTEI2, ..., CTEIn based on the first through n-th frame data FD1, FD2, ..., FDn, respectively. For example, a k-th image sensor 100-k may generate k-th color temperature estimation information CTEIk, which is used to estimate a color temperature of a light source from which the incident light is originated, by analyzing the k-th frame data FDk. An operation of the k-th image sensor 100-k to generate the k-th color temperature estimation information CTEIk based on the k-th frame data FDk will be described later. Additionally, each of the first through n-th image sensors 100-1, 100-2, ..., 100-n receives color temperature estimation information CTEI from the other of the image sensors. For example, a first image sensor 100-1 generates and outputs CTEI1, and receives CTEI2, ..., CTEIn from the remaining images sensors 100-2, ..., 100-n. Similarly, a second image sensor 100-2 generates and outputs CTEI2, and receives CTEI1, CTEI3, ..., CTEIn from the first image sensor 100-1 and from image sensors 100-3, ..., 100-n, and so on.

The first through n-th image sensors 100-1, 100-2, ..., 100-n generate first through n-th color temperature data CTD1, CTD2, ..., CTDn, respectively, by estimating the color temperature of the light source based on the first through n-th color temperature estimation information CTEI1, CTEI2, ..., CTEIn.

For example, a k-th image sensor 100-k may select at least one color temperature estimation information among the first through n-th color temperature estimation information CTEI1, CTEI2, ..., CTEIn based on whether an amount of each of the first through n-th color temperature estimation information CTEI1, CTEI2, ..., CTEIn is sufficient to estimate the color temperature of the light source, and generate k-th color temperature data CTDk by estimating the color temperature of the light source based on the selected at least one color temperature estimation information.

In some exemplary embodiments, when the amount of the k-th color temperature estimation information CTEIk is sufficient to estimate the color temperature of the light source, the k-th image sensor 100-k may generate the k-th color temperature data CTDk by estimating the color temperature of the light source based on the k-th color temperature estimation information CTEIk. That is, in this case, the k-th image sensor 100-k may generate the CTDk using its own color temperature estimation information CTEIk. However, when the amount of the k-th color temperature estimation information CTEIk (i.e., its own CTEIk) is insufficient to estimate the color temperature of the light source, the k-th image sensor 100-k may select at least one color temperature estimation information among the remaining ones of the first through n-th color temperature estimation information CTEI1, CTEI2, . . . , CTEIn based on whether the amount of each of the first through n-th color temperature estimation information CTEI1, CTEI2, . . . , CTEIn is sufficient to estimate the color temperature of the light source, and generate the k-th color temperature data CTDk by estimating the color temperature of the light source based on the selected at least one color temperature estimation information.

The image processor 200 generates first through n-th adjusted frame data AFD1, AFD2, . . . , AFDn, which correspond to automatic white balance (AWB) calibrated versions of the first through n-th frame data FD1, FD2, . . . , FDn, respectively, by adjusting the first through n-th frame data FD1, FD2, . . . , FDn based on the first through n-th color temperature data CTD1, CTD2, . . . , CTDn, respectively. That is, for example, the image processor 200 generates 1st adjusted frame data AFD1 by adjusting the 1st frame data FD1 based on the 1st color temperature data CTD1, and generates 2nd adjusted frame data AFD2 by adjusting the 2nd frame data FD2 based on the 2nd color temperature data CTD2, and so on.

Figure 2:
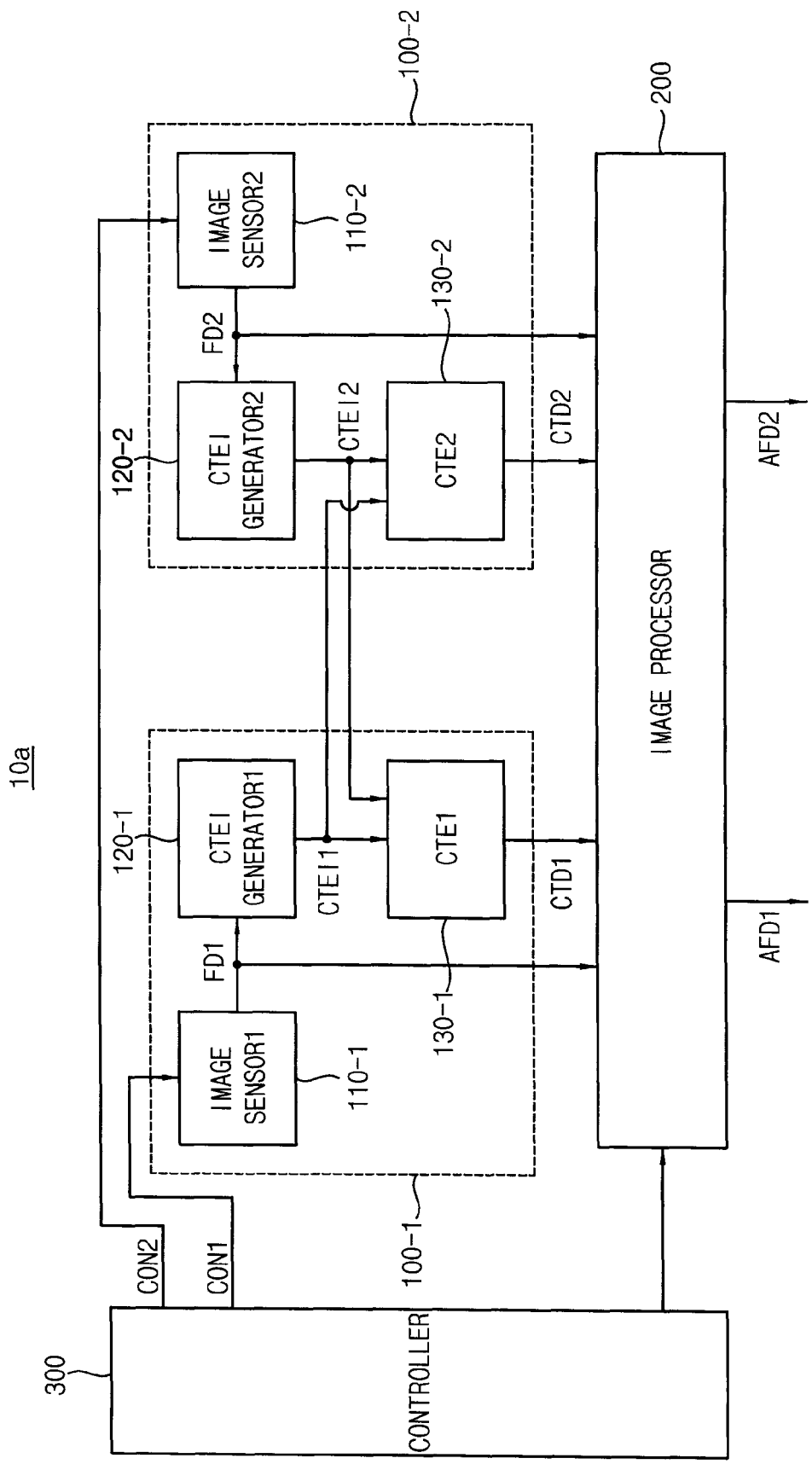
FIG. 2 is a block diagram illustrating an example of an image capturing device of FIG. 1 in more detail, according to an exemplary embodiment.

FIG. 2 is a block diagram illustrating an example of the image capturing device of FIG. 1 in more detail, according to an exemplary embodiment.

For ease of explanation, an image capturing device 10a including two image sensors is illustrated in FIG. 2. However, exemplary embodiments are not limited thereto, and the image capturing device 10a may include more than two image sensors.

Referring to FIG. 2, the image capturing device 10a may include a first image sensor 100-1, a second image sensor 100-2, an image processor 200 and a controller 300.

The first image sensor 100-1 may include a first image sensor (IMAGE SENSOR1) 110-1, a first color temperature estimation information generator (CTEI GENERATOR1) 120-1 and a first color temperature estimator (CTE 1) 130-1.

The second image sensor 100-2 may include a second image sensor (IMAGE SENSOR2) 110-2, a second color temperature estimation information generator (CTEI GENERATOR2) 120-2 and a second color temperature estimator (CTE 2) 130-2.

The first image sensor 110-1 may generate first frame data FD1 in response to incident light on the first image sensor 110-1 while the first image sensor 110-1 is turned on in response to a first control signal CON1 provided from the controller 300. That is, in response to the first control signal CON1, the first image sensor 110-1 is turned on and senses the incident light, and generates the first frame data FD1 from the sensed incident light.

The first color temperature estimation information generator 120-1 may generate first color temperature estimation information CTEI1 based on the first frame data FD1 and provide the first color temperature estimation information CTEI1 to the first color temperature estimator 130-1 and the second color temperature estimator 130-2.

The second image sensor 110-2 may generate second frame data FD2 in response to the incident light while the second image sensor 110-2 is turned on in response to a second control signal CON2 provided from the controller 300. That is, in response to the second control signal CON2, the second image sensor 110-2 is turned on and senses the incident light, and generates the second frame data FD2 from the sensed incident light.

The second color temperature estimation information generator 120-2 may generate second color temperature estimation information CTEI2 based on the second frame data FD2 and provide the second color temperature estimation information CTEI2 to the first color temperature estimator 130-1 and the second color temperature estimator 130-2.

In the first image sensor 100-1, when an amount of the first color temperature estimation information CTEI1 is sufficient to estimate the color temperature of the light source, the first color temperature estimator 130-1 may generate a first color temperature data CTD1 by estimating the color temperature of the light source based on the first color temperature estimation information CTEI1. On the other hand, when the amount of the first color temperature estimation information CTEI1 is insufficient to estimate the color temperature of the light source, the first color temperature estimator 130-1 may generate the first color temperature data CTD1 by estimating the color temperature of the light source based on the second color temperature estimation information CTEI2 if an amount of the second color temperature estimation information CTEI2 is sufficient to estimate the color temperature of the light source, or may generate the first color temperature data CTD1 by estimating the color temperature of the light source based on the first color temperature estimation information CTEI1 if the amount of the second color temperature estimation information CTEI2 is insufficient to estimate the color temperature of the light source.

Turning to the second image sensor 100-2, the amount of the second color temperature estimation information CTEI2 is sufficient to estimate the color temperature of the light source, the second color temperature estimator 130-2 may generate a second color temperature data CTD2 by estimating the color temperature of the light source based on the second color temperature estimation information CTEI2. On the other hand, when the amount of the second color temperature estimation information CTEI2 is insufficient to estimate the color temperature of the light source, the second color temperature estimator 130-2 may generate the second color temperature data CTD2 by estimating the color temperature of the light source based on the first color temperature estimation information CTEI1 if the amount of the first color temperature estimation information CTEI1 is sufficient to estimate the color temperature of the light source, or may generate the second color temperature data CTD2 by estimating the color temperature of the light source based on the second color temperature estimation information CTEI2 if the amount of the first color temperature estimation information CTEI1 is insufficient to estimate the color temperature of the light source.

The image processor 200 may generate a first adjusted frame data AFD1, which corresponds to an AWB calibrated version of the first frame data FD1, by adjusting the first frame data FD1 based on the first color temperature data CTD1, and may generate a second adjusted frame data AFD2, which corresponds to an AWB calibrated version of the second frame data FD2, by adjusting the second frame data FD2 based on the second color temperature data CTD2.

Figure 3:
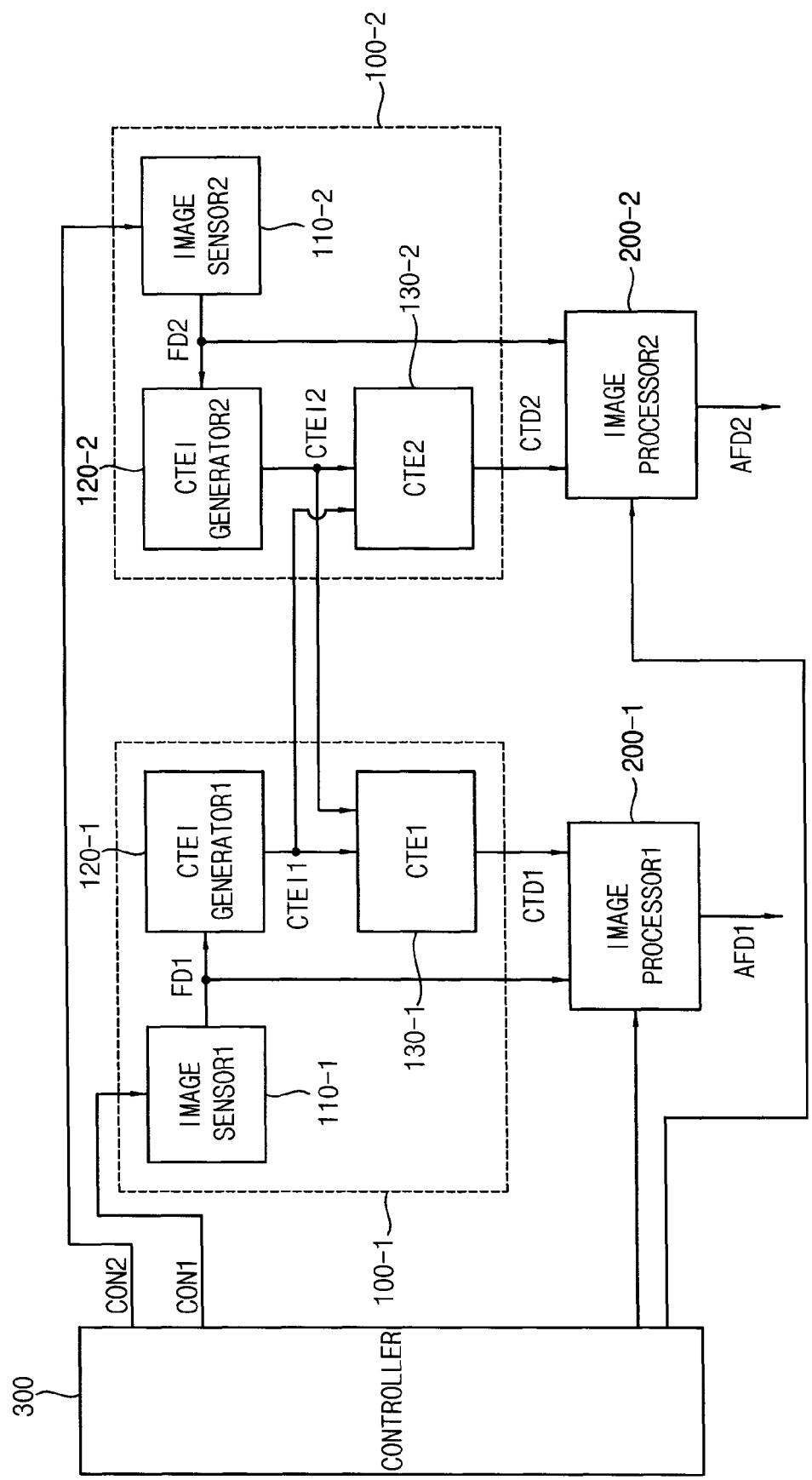
FIG. 3 is a block diagram illustrating another example of an image capturing device of FIG. 1 in more detail, according to another exemplary embodiment.

FIG. 3 is a block diagram illustrating an example of the image capturing device of FIG. 1 in more detail, according to another exemplary embodiment.

Referring to FIG. 3, an image capturing device 10b may include a first image sensor 100-1, a second image sensor 100-2, a first image processor 200-1, a second image processor 200-2 and a controller 300. Thus, the image capturing device 10b of FIG. 3 may be the same as the image capturing device 10a of FIG. 2 except that the image capturing device 10b of FIG. 3 includes the first image processor 200-1 and the second image processor 200-2, instead of a common image processor 200

The first image processor 200-1 may generate the first adjusted frame data AFD1, which corresponds to an AWB calibrated version of the first frame data FD1, by adjusting the first frame data FD1 based on the first color temperature data CTD1.

The second image processor 200-2 may generate the second adjusted frame data AFD2, which corresponds to an AWB calibrated version of the second frame data FD2, by adjusting the second frame data FD2 based on the second color temperature data CTD2.

The remaining features of the image capturing device 10b are similar to those of the image capturing device 10a of FIG. 2, and therefore a detailed description of the image capturing device 10b of FIG. 3 will be omitted.

Figure 4:
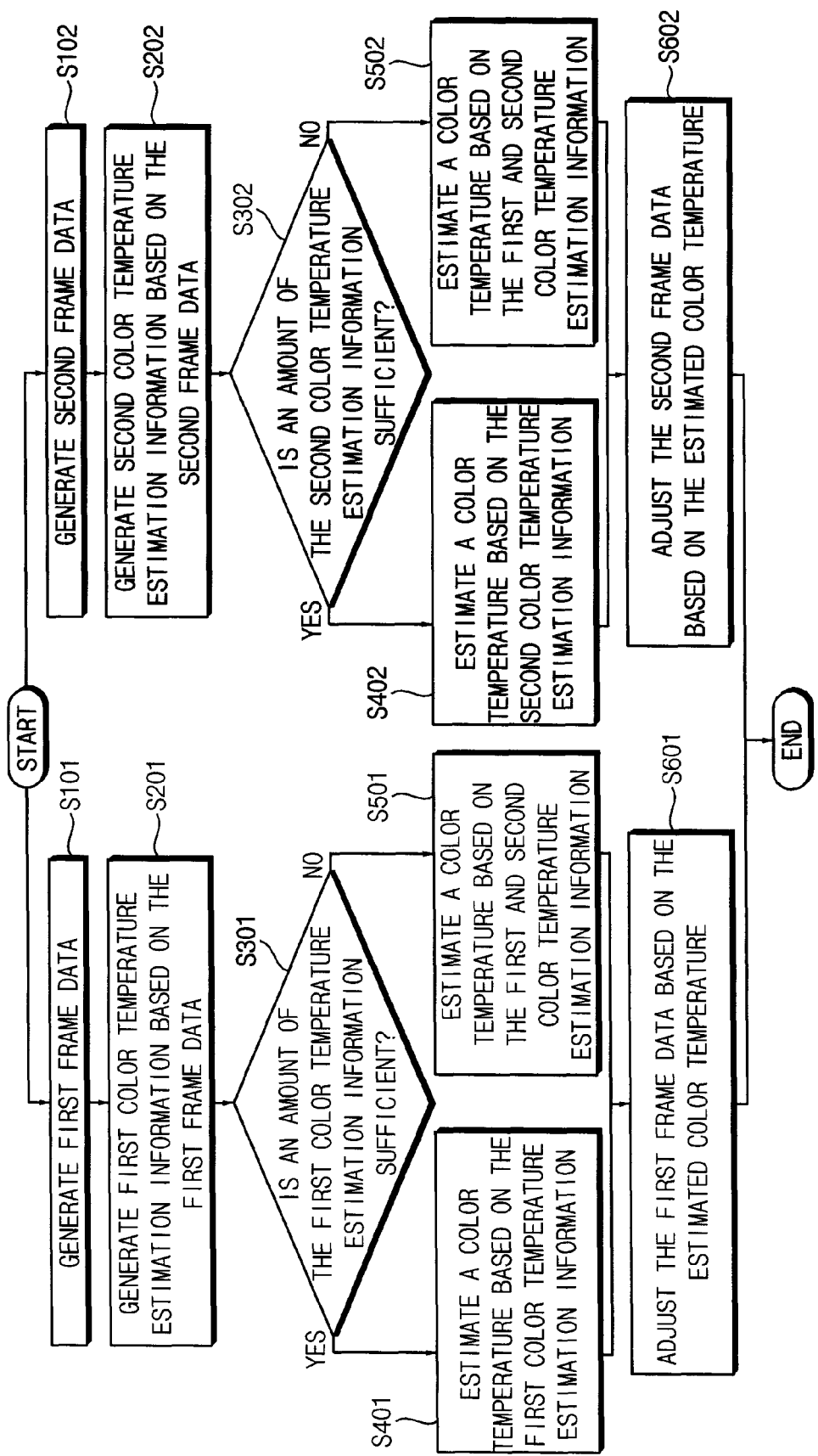
FIG. 4 is a flow chart illustrating a method of calibrating automatic white balance (AWB) in an image capturing device according to exemplary embodiments.

FIG. 4 is a flow chart illustrating a method of calibrating automatic white balance (AWB) in an image capturing device according to exemplary embodiments.

For ease of explanation, a method of calibrating AWB in an image capturing device including a first image sensor and a second image sensor is illustrated in FIG. 4. However, exemplary embodiments are not limited thereto, and the method of FIG. 4 may be similarly performed by an image capturing device including more than two image sensors.

Referring to FIG. 4, first frame data is generated using a first image sensor in response to incident light while the first image sensor is turned on (operation S101), and second frame data is generated using a second image sensor in response to the incident light while the second image sensor is turned on (operation S102). Each of the first frame data and the second frame data may include a plurality of pixel data corresponding to one frame.

When the first image sensor is turned on, first color temperature estimation information, which is used to estimate a color temperature of a light source from which the incident light is originated, is generated based on the first frame data (operation S201). When the second image sensor is turned on, second color temperature estimation information, which is used to estimate the color temperature of the light source from which the incident light is originated, is generated based on the second frame data (operation S202).

Whether an amount of the first color temperature estimation information is sufficient to estimate the color temperature of the light source is determined (operation S301).

When the amount of the first color temperature estimation information is sufficient to estimate the color temperature of the light source (operation S301; YES), the color temperature of the light source is estimated based on the first color temperature estimation information (operation S401).

On the other hand, when the amount of the first color temperature estimation information is insufficient to estimate the color temperature of the light source (operation S301; NO), the color temperature of the light source is estimated based on the first color temperature estimation information and the second color temperature estimation information (operation S501).

A first adjusted frame data, which corresponds to an AWB calibrated version of the first frame data, is generated by adjusting the first frame data based on the estimated color temperature (operation S601).

Similarly, whether an amount of the second color temperature estimation information is sufficient to estimate the color temperature of the light source is determined (operation S302).

When the amount of the second color temperature estimation information is sufficient to estimate the color temperature of the light source (operation S302; YES), the color temperature of the light source is estimated based on the second color temperature estimation information (operation S402).

On the other hand, when the amount of the second color temperature estimation information is insufficient to estimate the color temperature of the light source (operation S302; NO), the color temperature of the light source is estimated based on the first color temperature estimation information and the second color temperature estimation information (operation S502).

A second adjusted frame data, which corresponds to an AWB calibrated version of the second frame data, is generated by adjusting the second frame data based on the estimated color temperature (operation S602).

The method of calibrating AWB of FIG. 4 may be performed by the image capturing device 10a of FIG. 2.

Hereinafter, the method of calibrating AWB in the image capturing device 10a will be described with reference to FIGS. 2 and 4.

The controller 300 may turn on the first image sensor 110-1 using the first control signal CON1, and turn on the second image sensor 110-2 using the second control signal CON2.

The first image sensor 110-1 may generate the first frame data FD1 in response to the incident light while the first image sensor 110-1 is turned on (operation S101). The second image sensor 110-2 may generate the second frame data FD2 in response to the incident light while the second image sensor 110-2 is turned on (operation S102).

When the first image sensor 110-1 is turned on, the first color temperature estimation information generator 120-1 may generate the first color temperature estimation information CTEI1, which is used to estimate the color temperature of the light source from which the incident light is originated, based on the first frame data FD1 provided from the first image sensor 110-1 (operation S201).

Figure 5:
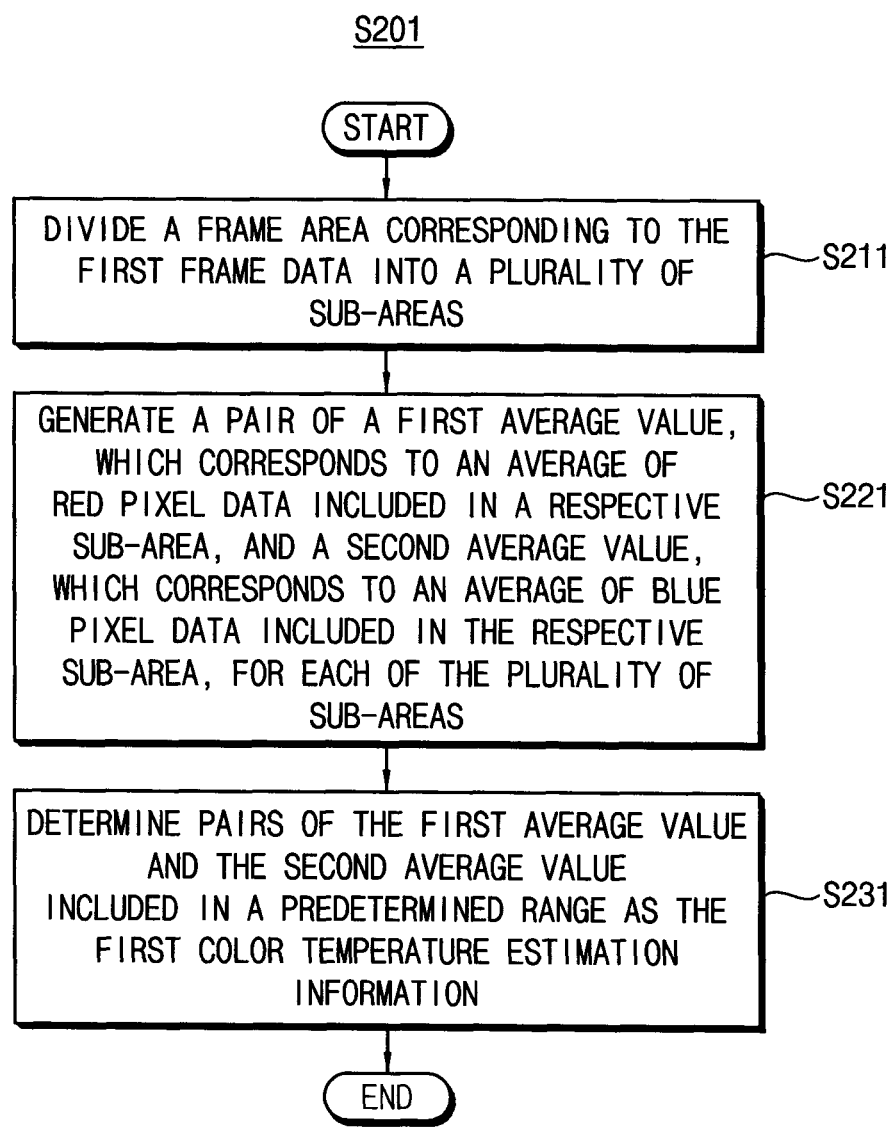
FIG. 5 is a flow chart illustrating an example of generating first color temperature estimation information based on a first frame data in FIG. 4, according to an exemplary embodiment.
Figure 6:
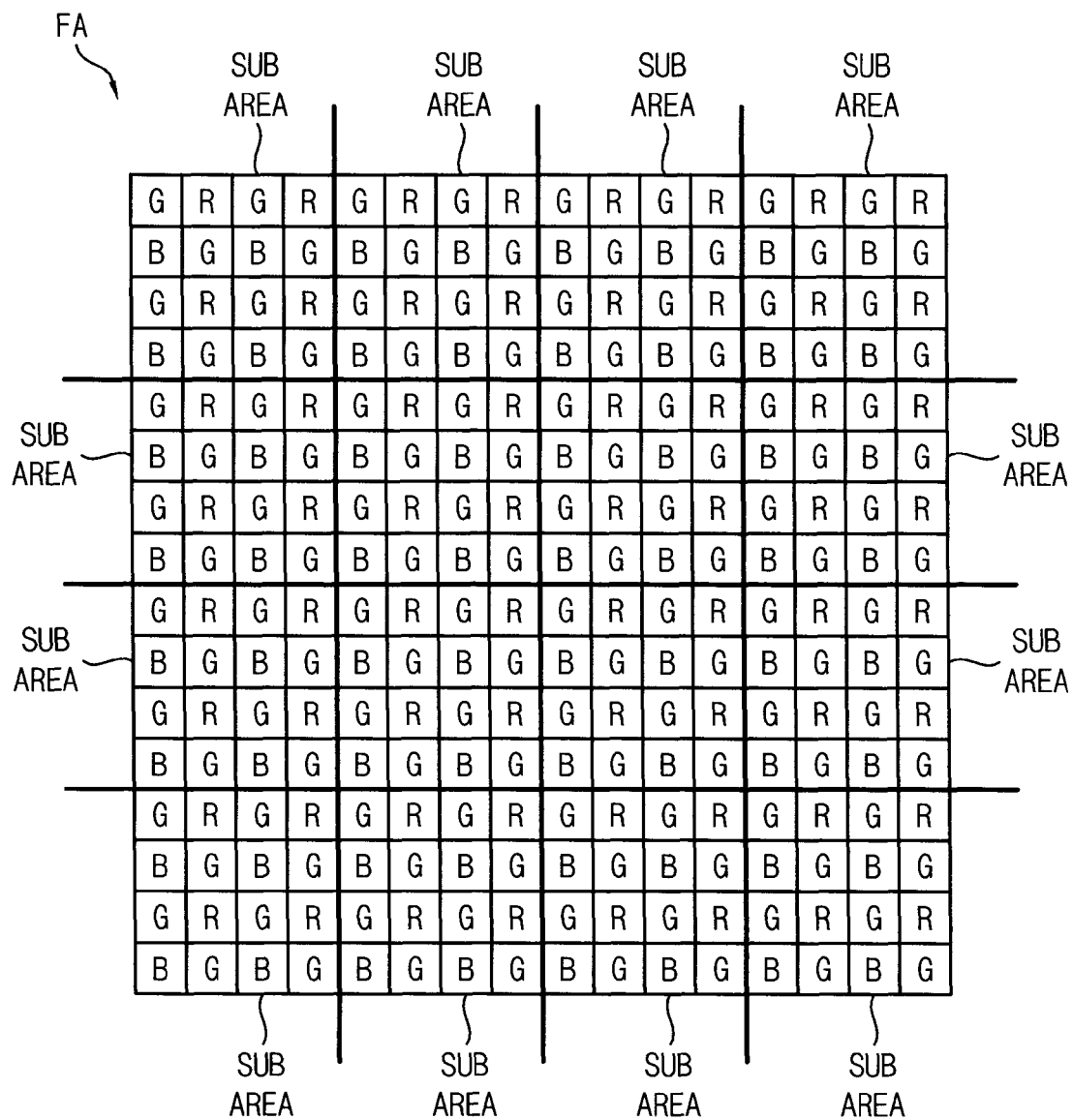
FIGS. 6 and 7 are diagrams for describing an operation of a first color temperature estimation information generator included in an image capturing device of FIG. 2.
Figure 7:
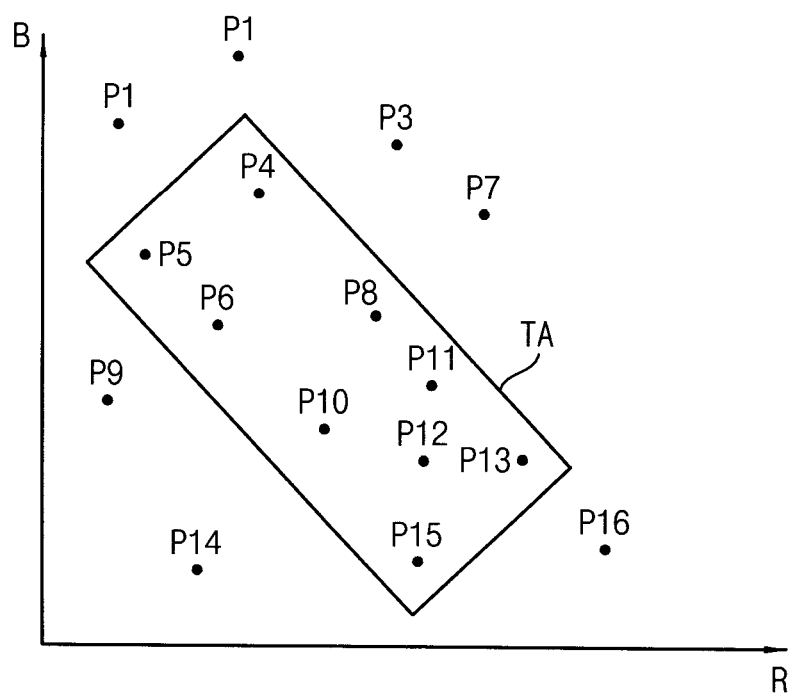

FIG. 5 is a flow chart illustrating an example of generating first color temperature estimation information based on first frame data (operation S201) of FIG. 4. FIGS. 6 and 7 are diagrams for describing an operation of the first color temperature estimation information generator included in an image capturing device of FIG. 2.

Referring to FIGS. 5, 6 and 7, the first color temperature estimation information generator 120-1 may divide a frame area FA corresponding to the first frame data FD1 into a plurality of sub-areas (operation S211). For example, as illustrated in FIG. 6, the frame area FA may be divided into first through sixteenth sub-areas. Each of the plurality of sub-areas may include a plurality of red pixel data R, a plurality of green pixel data G and a plurality of blue pixel data B. For example, the frame area FA on the upper right-hand corner includes eight green pixel data G, four blue pixel data, and four red pixel data.

The first color temperature estimation information generator 120-1 may generate a pair P of a first average value and a second average value for each of the plurality of sub-areas (operation S221). The first average value corresponds to an average of the red pixel data R included in a respective sub-area, and the second average value corresponds to an average of the blue pixel data B included in the respective sub-area. For example, when the frame area FA is divided into the first through sixteenth sub-areas as illustrated in FIG. 6, the first color temperature estimation information generator 120-1 may generate first through sixteenth pairs P1 to P16 of the first average value and the second average value corresponding to the first through sixteenth sub-areas, respectively.

FIG. 7 is a graph illustrating an example of the pairs of the first average value and the second average value generated from the first color temperature estimation information generator 120-1 for the plurality of sub-areas.

In FIG. 7, x-axis represents a value of the red pixel data R, and y-axis represents a value of the blue pixel data B.

The first through sixteenth pairs P1, P2, . . . , P16 of the first average value and the second average value are illustrated in FIG. 7.

The first color temperature estimation information generator 120-1 may determine pairs P of the first average value and the second average value included in a range TA among the pairs P of the first average value and the second average value for the plurality of sub-areas as the first color temperature estimation information CTEI1 (operation S231). The range TA may be predetermined.

For example, in the example shown in FIG. 7, among the first through sixteenth pairs P1, P2, . . . , P16 of the first average value and the second average value for the first through sixteenth sub-areas, the first color temperature estimation information generator 120-1 may determine the fourth, fifth, sixth, eighth, tenth, eleventh, twelfth, thirteenth and fifteenth pairs P4, P5, P6, P8, P10, P11, P12, P13 and P15 of the first average value and the second average value, which are included in the threshold range TA, as the first color temperature estimation information CTEI1.

The range TA may be determined based on a range of changes of an average of the red pixel data R and an average of the blue pixel data B when a subject of gray color is captured under each of various kinds of light sources. Therefore, a ratio of a number of the pairs P of the first average value and the second average value included in the range TA to a total number of the pairs P of the first average value and the second average value for the plurality of sub-areas may increase when a captured subject includes a relatively large amount gray color, and the ratio may decrease when the captured subject includes a relatively small amount of gray color.

Referring again to FIGS. 2 and 4, when the second image sensor 110-2 is turned on, the second color temperature estimation information generator 120-2 may generate the second color temperature estimation information CTEI2, which is used to estimate the color temperature of the light source from which the incident light is originated, based on the second frame data FD2 provided from the second image sensor 110-2 (operation S202).

The second color temperature estimation information generator 120-2 may operate the same as the first color temperature estimation information generator 120-1. For example, the second color temperature estimation information generator 120-2 may generate the second color temperature estimation information CTEI2 based on the second frame data FD2 in the same way described above with reference to FIGS. 5, 6 and 7.

The first color temperature estimator 130-1 may determine whether an amount of the first color temperature estimation information CTEI1 is sufficient to estimate the color temperature of the light source (operation S301).

In some exemplary embodiments, the first color temperature estimator 130-1 may determine that the amount of the first color temperature estimation information CTEI1 is sufficient to estimate the color temperature of the light source when a ratio of a number of the pairs P of the first average value and the second average value included in the range TA to a total number of the plurality of sub-areas is greater than a threshold ratio. The threshold ratio may be predetermined, and may be determined experimentally. The first color temperature estimator 130-1 may determine that the amount of the first color temperature estimation information CTEI1 is insufficient to estimate the color temperature of the light source when the ratio of the number of the pairs P of the first average value and the second average value included in the range TA to the total number of the plurality of sub-areas is equal to or smaller than the threshold ratio.

For example, in the example shown in FIG. 7, since the total number of the plurality of sub-areas is sixteen and the number of the pairs P of the first average value and the second average value included in the range TA is nine, the first color temperature estimator 130-1 may determine that the amount of the first color temperature estimation information CTEI1 is sufficient to estimate the color temperature of the light source when the threshold ratio is smaller than 9/16, and determine that the amount of the first color temperature estimation information CTEI1 is insufficient to estimate the color temperature of the light source when the threshold ratio is equal to or greater than 9/16.

In some exemplary embodiments, the threshold ratio may be provided from the controller 300 to the first color temperature estimator 130-1. In other exemplary embodiments, the threshold ratio may be internally stored in the first color temperature estimator 130-1.

When the amount of the first color temperature estimation information CTEI1 is sufficient to estimate the color temperature of the light source (operation S301; YES), the first color temperature estimator 130-1 may generate the first color temperature data CTD1 by estimating the color temperature of the light source based on the first color temperature estimation information CTEI1 (operation S401).

In some exemplary embodiments, the first color temperature estimator 130-1 may calculate a red average value, which corresponds to an arithmetic average of the first average values included in the first color temperature estimation information CTEI1, and a blue average value, which corresponds to an arithmetic average of the second average values included in the first color temperature estimation information CTEI1. For example, when the fourth, fifth, sixth, eighth, tenth, eleventh, twelfth, thirteenth and fifteenth pairs P4, P5, P6, P8, P10, P11, P12, P13 and P15 of the first average value and the second average value are included in the first color temperature estimation information CTEI1 as illustrated in FIG. 7, the first color temperature estimator 130-1 may calculate an arithmetic average of nine first average values included in the fourth, fifth, sixth, eighth, tenth, eleventh, twelfth, thirteenth and fifteenth pairs P4, P5, P6, P8, P10, P11, P12, P13 and P15 of the first average value and the second average value to generate the red average value, and calculate an arithmetic average of nine second average values included in the fourth, fifth, sixth, eighth, tenth, eleventh, twelfth, thirteenth and fifteenth pairs P4, P5, P6, P8, P10, P11, P12, P13 and P15 of the first average value and the second average value to generate the blue average value. The first color temperature estimator 130-1 may output a pair P of the red average value and the blue average value as the first color temperature data CTD1 corresponding to the estimated color temperature.

Figure 8:
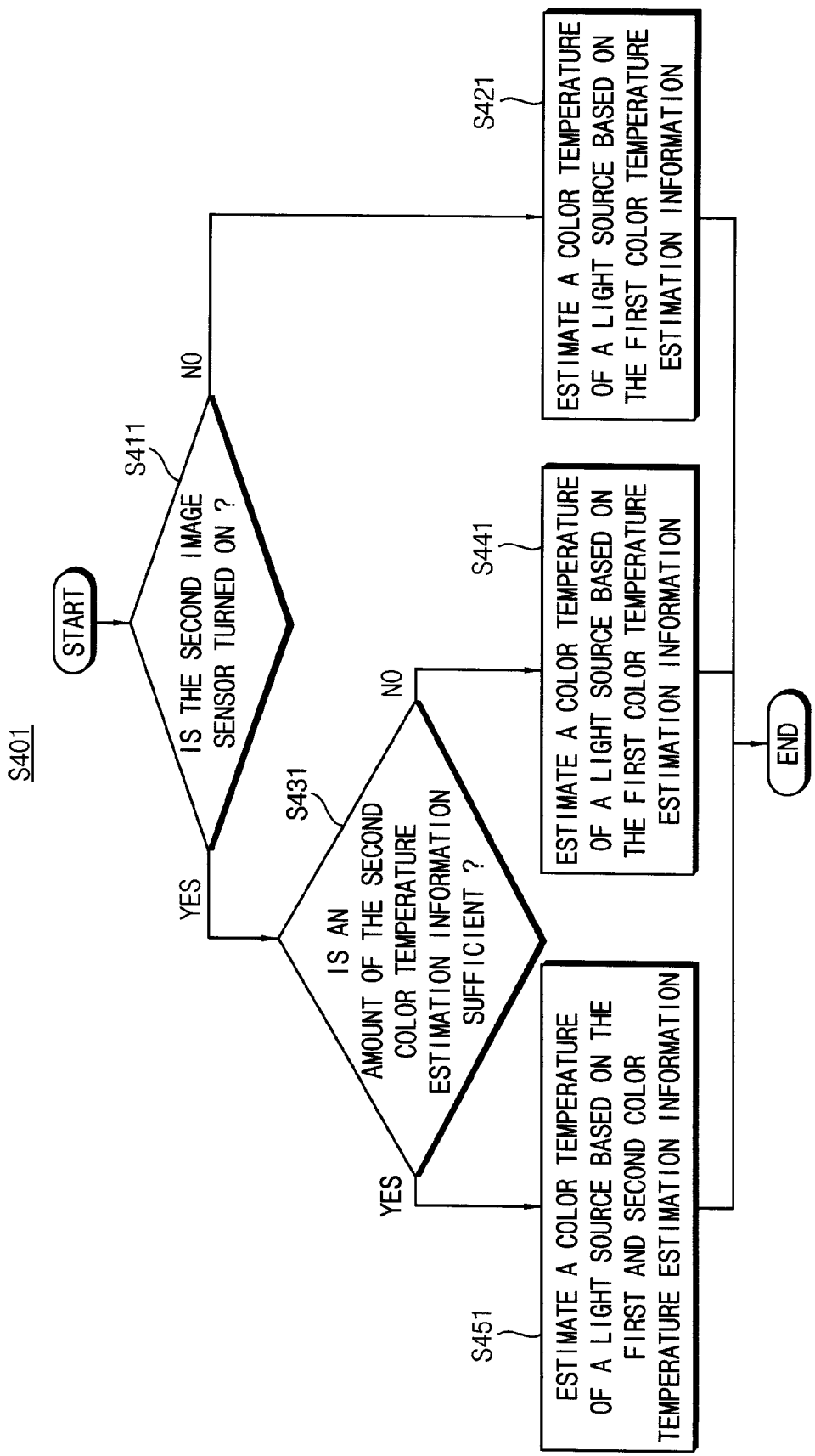
FIG. 8 is a flow chart illustrating an example of estimating a color temperature of a light source based on first color temperature estimation information when an amount of the first color temperature estimation information is sufficient in FIG. 4, according to an exemplary embodiment.

FIG. 8 is a flow chart illustrating an example of estimating a color temperature of a light source based on first color temperature estimation information when an amount of the first color temperature estimation information is sufficient in operation S401 of FIG. 4.

When the amount of the first color temperature estimation information CTEI1 is sufficient to estimate the color temperature of the light source (See FIG. 4 at operation S301; YES), the first color temperature estimator 130-1 may generate the first color temperature data CTD1 by estimating the color temperature of the light source according to the flow chart of FIG. 8 to increase an accuracy of the estimation of the color temperature.

Referring to FIG. 8, when the amount of the first color temperature estimation information CTEI1 is sufficient to estimate the color temperature of the light source (FIG. 4, operation S301; YES), the first color temperature estimator 130-1 may determine whether the second image sensor 110-2 is turned on (operation S411).

When the second image sensor 110-2 is turned off (operation S411; NO), the first color temperature estimator 130-1 may generate the first color temperature data CTD1 by estimating the color temperature of the light source based on the first color temperature estimation information CTEI1 (operation S421) since the first color temperature estimator 130-1 does not receive the second color temperature estimation information CTEI2 from the second color temperature estimation information generator 120-2. The method of generating the first color temperature data CTD1 based on the first color temperature estimation information CTEI1 performed by the first color temperature estimator 130-1 is described above. Therefore, duplicated description will be omitted here.

When the second image sensor 110-2 is turned on (operation S411; YES), the first color temperature estimator 130-1 may determine whether an amount of the second color temperature estimation information CTEI2 provided from the second color temperature estimation information generator 120-2 is sufficient to estimate the color temperature of the light source (operation S431). The method of determining whether the amount of the second color temperature estimation information CTEI2 is sufficient to estimate the color temperature of the light source is substantially the same as the method of determining whether the amount of the first color temperature estimation information CTEI1 is sufficient to estimate the color temperature of the light source. Therefore, duplicated description will be omitted here.

When the amount of the second color temperature estimation information CTEI2 is insufficient (operation S431; NO), the first color temperature estimator 130-1 may generate the first color temperature data CTD1 by estimating the color temperature of the light source based on the first color temperature estimation information CTEI1 without considering the second color temperature estimation information CTEI2 (operation S441).

On the other hand, when the amount of the second color temperature estimation information CTEI2 is sufficient (operation S431; YES), the first color temperature estimator 130-1 may generate the first color temperature data CTD1 by estimating the color temperature of the light source based on the first color temperature estimation information CTEI1 and the second color temperature estimation information CTEI2 (operation S451).

Figure 9:
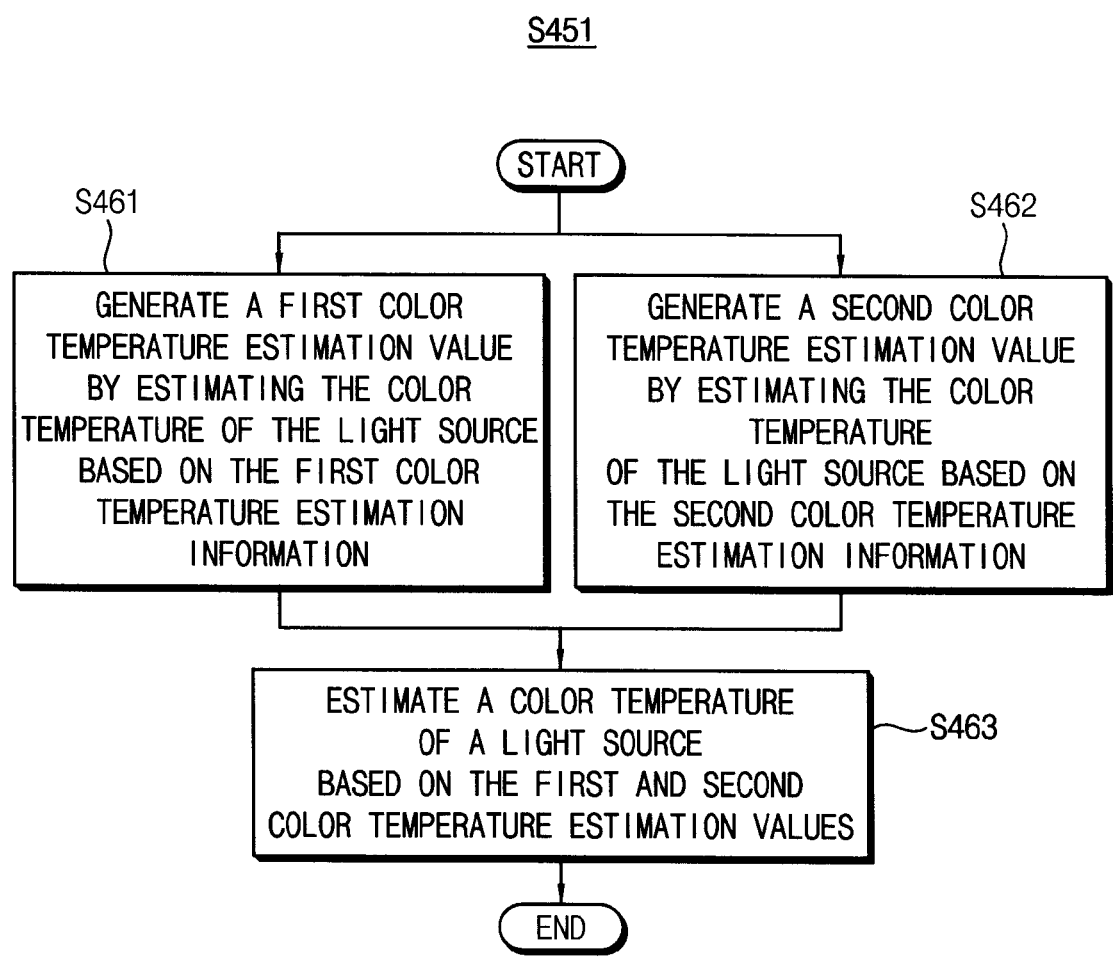
FIG. 9 is a flow chart illustrating an example of estimating a color temperature of a light source based on first color temperature estimation information and second color temperature estimation information in FIG. 8, according to an exemplary embodiment.

FIG. 9 is a flow chart illustrating an example of estimating a color temperature of a light source based on first color temperature estimation information and a second color temperature estimation information in operation S451 of FIG. 8, according to an exemplary embodiment.

Referring to FIG. 9, the first color temperature estimator 130-1 may generate a first color temperature estimation value by estimating the color temperature of the light source based on the first color temperature estimation information CTEI1 (operation S461), and generate a second color temperature estimation value by estimating the color temperature of the light source based on the second color temperature estimation information CTEI2 (operation S462). The method of generating the first color temperature estimation value and the second color temperature estimation value based on the first color temperature estimation information CTEI1 and the second color temperature estimation information CTEI2, respectively, performed by the first color temperature estimator 130-1 is substantially the same as the method of generating the first color temperature data CTD1 based on the first color temperature estimation information CTEI1, which is described above. Therefore, the first color temperature estimation value may include a pair P of the red average value and the blue average value, where the red average value corresponds to an arithmetic average of the first average values included in the first color temperature estimation information CTEI1, and the blue average value corresponds to an arithmetic average of the second average values included in the first color temperature estimation information CTEI1. The second color temperature estimation value may include a pair P of the red average value and the blue average value, where the red average value corresponds to an arithmetic average of the first average values included in the second color temperature estimation information CTEI2, and the blue average value corresponds to an arithmetic average of the second average values included in the second color temperature estimation information CTEI2.

The first color temperature estimator 130-1 may generate the first color temperature data CTD1 by estimating the color temperature of the light source based on the first color temperature estimation value and the second color temperature estimation value (operation S463).

In some exemplary embodiments, the first color temperature estimator 130-1 may generate a first weight value and a second weight value that are proportional to the amount of the first color temperature estimation information CTEI1 and the amount of the second color temperature estimation information CTEI2, respectively. For example, the first color temperature estimator 130-1 may determine a ratio of a number of the pairs P of the first average value and the second average value included in the first color temperature estimation information CTEI1 to the total number of the plurality of sub-areas as the first weight value, and determine a ratio of a number of the pairs P of the first average value and the second average value included in the second color temperature estimation information CTEI2 to the total number of the plurality of sub-areas as the second weight value.

The first color temperature estimator 130-1 may calculate a weighted average value of the first color temperature estimation value and the second color temperature estimation value using the first weight value and the second weight value, and generate the first color temperature data CTD1 based on the weighted average value. For example, the first color temperature estimator 130-1 may calculate a weighted average of the red average values of the first color temperature estimation value and the second color temperature estimation value using the first weight value and the second weight value to generate the red average value of the first color temperature data CTD1, and calculate a weighted average of the blue average values of the first color temperature estimation value and the second color temperature estimation value using the first weight value and the second weight value to generate the blue average value of the first color temperature data CTD1.

Figure 10:
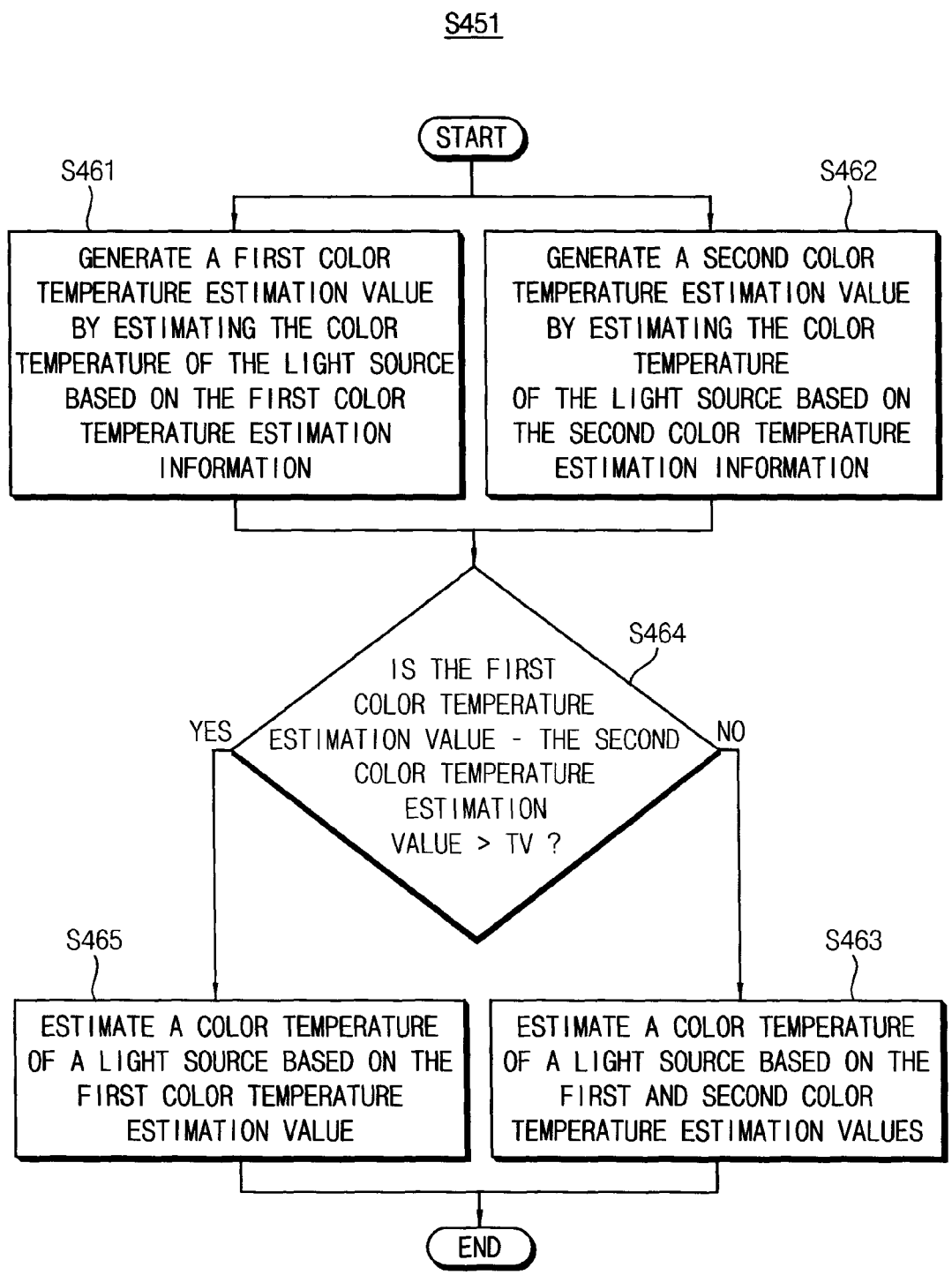
FIG. 10 is a flow chart illustrating another example of estimating a color temperature of a light source based on first color temperature estimation information and second color temperature estimation information of FIG. 8, according to another exemplary embodiment.

FIG. 10 is a flow chart illustrating an example of estimating a color temperature of a light source based on first color temperature estimation information and a second color temperature estimation information in operation S451 of FIG. 8, according to another exemplary embodiment.

Referring to FIG. 10, the first color temperature estimator 130-1 may generate a first color temperature estimation value by estimating the color temperature of the light source based on the first color temperature estimation information CTEI1 (operation S461), and generate a second color temperature estimation value by estimating the color temperature of the light source based on the second color temperature estimation information CTEI2 (operation S462).

After that, the first color temperature estimator 130-1 may determine whether a difference between the first color temperature estimation value and the second color temperature estimation value is greater than a threshold value TV (operation S464). Here, the threshold value TV may be predetermined, and may be determined experimentally When the difference between the first color temperature estimation value and the second color temperature estimation value is greater than the threshold value TV (operation S464; YES), the first color temperature estimator 130-1 may generate the first color temperature data CTD1 by estimating the color temperature of the light source based on the first color temperature estimation value (operation S465). For example, when the difference between the first color temperature estimation value and the second color temperature estimation value is greater than the threshold value TV (operation S464; YES), the first color temperature estimator 130-1 may determine the red average value and the blue average value of the first color temperature estimation value as the red average value and the blue average value of the first color temperature data CTD1, respectively. The difference between the first color temperature estimation value and the second color temperature estimation value may be greater than the threshold value TV when a light source from which incident light of the first image sensor 110-1 is originated and a light source from which incident light of the second image sensor 110-2 is originated are different from each other. In this case, the first color temperature estimator 130-1 may generate the first color temperature data CTD1 by estimating the color temperature of the light source based on the first color temperature estimation information CTEI1 without considering the second color temperature estimation information CTEI2 such that an accuracy of the estimation of the color temperature may be increased.

On the other hand, when the difference between the first color temperature estimation value and the second color temperature estimation value is equal to or smaller than the threshold value TV (operation S464; NO), the first color temperature estimator 130-1 may generate the first color temperature data CTD1 by estimating the color temperature of the light source based on the first color temperature estimation value and the second color temperature estimation value (operation S463).

Referring again to FIG. 4, when the amount of the first color temperature estimation information CTEI1 is insufficient to estimate the color temperature of the light source (operation S301; NO), the first color temperature estimator 130-1 may generate the first color temperature data CTD1 by estimating the color temperature of the light source based on the first color temperature estimation information CTEI1 and the second color temperature estimation information CTEI2 (operation S501).

Figure 11:
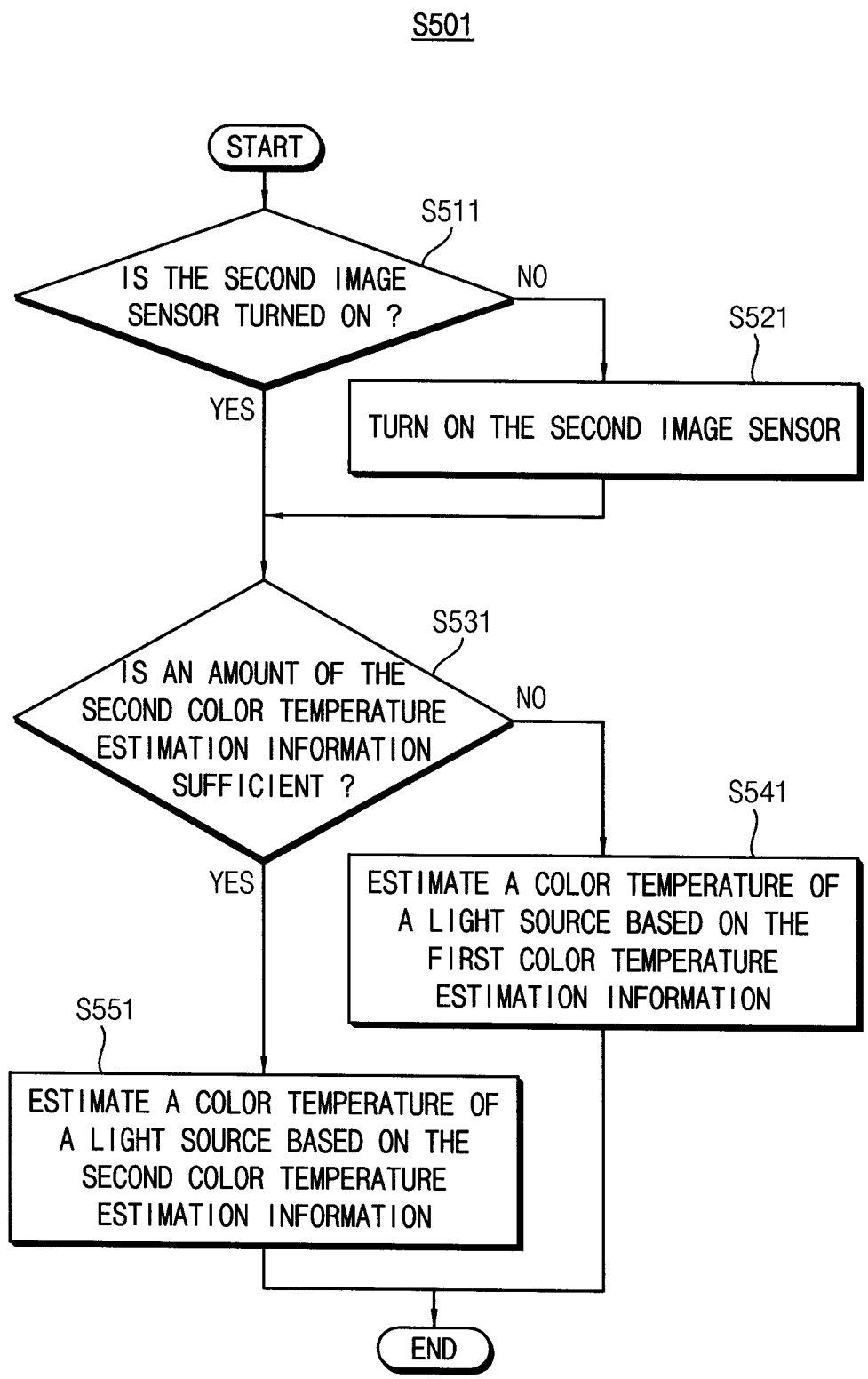
FIG. 11 is a flow chart illustrating an example of estimating a color temperature of a light source based on first color temperature estimation information and second color temperature estimation information when an amount of the first color temperature estimation information is insufficient in FIG. 4, according to an exemplary embodiment.

FIG. 11 is a flow chart illustrating an example of estimating a color temperature of a light source based on first color temperature estimation information and second color temperature estimation information when an amount of the first color temperature estimation information is insufficient in operation S501 of FIG. 4, according to an exemplary embodiment.

Referring to FIG. 11, when the amount of the first color temperature estimation information CTEI1 is insufficient to estimate the color temperature of the light source (FIG. 4, operation S301; NO), the first color temperature estimator 130-1 may determine whether the second image sensor 110-2 is turned on (operation S511).

When the second image sensor 110-2 is turned on (operation S511; YES), the process proceeds to operation S531. On the other hand, when the second image sensor 110-2 is turned off (operation S511; NO), the first color temperature estimator 130-1 may turn on the second image sensor 110-2 (operation S521). For example, the first color temperature estimator 130-1 may transmit a request signal for turning on the second image sensor 110-2 to the controller 300, and the controller 300 may provide the second control signal CON2 to the second image sensor 110-2 in response to the request signal to turn on the second image sensor 110-2. When the second image sensor 110-2 is turned on, the second image sensor 110-2 may generate the second frame data FD2 in response to the incident light, and the second color temperature estimation information generator 120-2 may generate the second color temperature estimation information CTEI2 based on the second frame data FD2. After the second image sensor 110-2 is turned on, the process proceeds to operation S531.

In operation S531, the first color temperature estimator 130-1 may determine whether an amount of the second color temperature estimation information CTEI2 provided from the second color temperature estimation information generator 120-2 is sufficient to estimate the color temperature of the light source.

When the amount of the second color temperature estimation information CTEI2 is insufficient to estimate the color temperature of the light source (operation S531; NO), the first color temperature estimator 130-1 may generate the first color temperature data CTD1 by estimating the color temperature of the light source based on the first color temperature estimation information CTEI1, which is generated based on the first frame data FD1 (operation S541), since both the first color temperature estimation information CTEI1 and the second color temperature estimation information CTEI2 are insufficient to estimate the color temperature of the light source.

On the other hand, when the amount of the second color temperature estimation information CTEI2 is sufficient to estimate the color temperature of the light source (operation S531; YES), the first color temperature estimator 130-1 may generate the first color temperature data CTD1 by estimating the color temperature of the light source based on the second color temperature estimation information CTEI2 (operation S551).

Referring again to FIG. 4, the second color temperature estimator 130-2 may determine whether an amount of the second color temperature estimation information CTEI2 is sufficient to estimate the color temperature of the light source (operation S302).

When the amount of the second color temperature estimation information CTEI2 is sufficient to estimate the color temperature of the light source (operation S302; YES), the second color temperature estimator 130-2 may generate the second color temperature data CTD2 by estimating the color temperature of the light source based on the second color temperature estimation information CTEI2 (operation S402).

Figure 12:
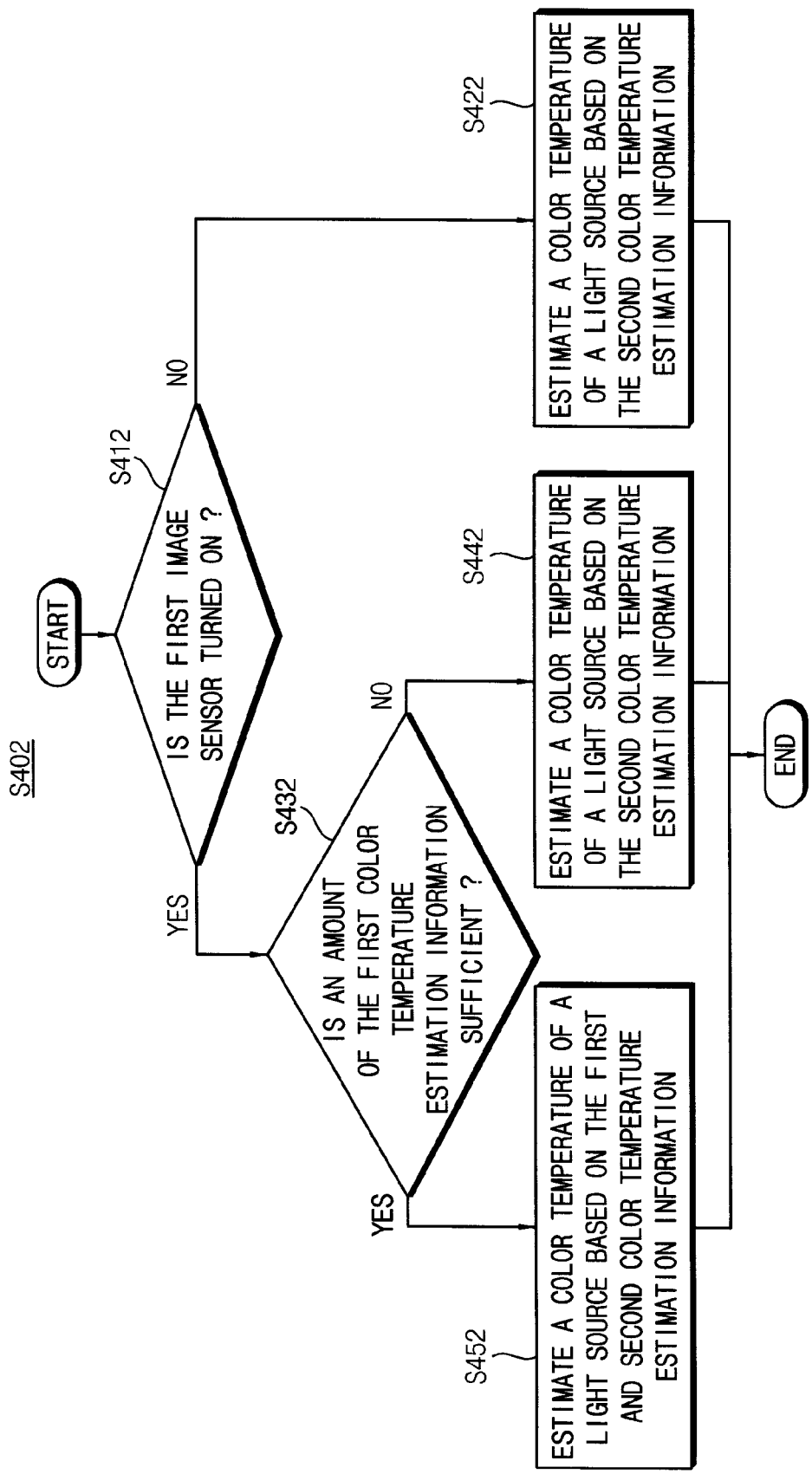
FIG. 12 is a flow chart illustrating an example of estimating a color temperature of a light source based on second color temperature estimation information when an amount of the second color temperature estimation information is sufficient in FIG. 4, according to an exemplary embodiment.

FIG. 12 is a flow chart illustrating an example of estimating a color temperature of a light source based on second color temperature estimation information when an amount of the second color temperature estimation information is sufficient in operation S402 of FIG. 4, according to an exemplary embodiment.

Referring to FIG. 12, when the amount of the second color temperature estimation information CTEI2 is sufficient to estimate the color temperature of the light source (operation S302; YES), the second color temperature estimator 130-2 may determine whether the first image sensor 110-1 is turned on (operation S412).

When the first image sensor 110-1 is turned off (operation S412; NO), the second color temperature estimator 130-2 may generate the second color temperature data CTD2 by estimating the color temperature of the light source based on the second color temperature estimation information CTEI2 (operation S422), since the second color temperature estimator 130-2 does not receive the first color temperature estimation information CTEI1 from the first color temperature estimation information generator 120-1.

When the first image sensor 110-1 is turned on (operation S412; YES), the second color temperature estimator 130-2 may determine whether an amount of the first color temperature estimation information CTEI1 provided from the first color temperature estimation information generator 120-1 is sufficient to estimate the color temperature of the light source (operation S432).

When the amount of the first color temperature estimation information CTEI1 is insufficient (operation S432; NO), the second color temperature estimator 130-2 may generate the second color temperature data CTD2 by estimating the color temperature of the light source based on the second color temperature estimation information CTEI2 without considering the first color temperature estimation information CTEI1 (operation S442).

When the amount of the first color temperature estimation information CTEI1 is sufficient (operation S432; YES), the second color temperature estimator 130-2 may generate the second color temperature data CTD2 by estimating the color temperature of the light source based on the first color temperature estimation information CTEI1 and the second color temperature estimation information CTEI2 (operation S452).

Referring again to FIG. 4, when the amount of the second color temperature estimation information CTEI2 is insufficient to estimate the color temperature of the light source (operation S302; NO), the second color temperature estimator 130-2 may generate the second color temperature data CTD2 by estimating the color temperature of the light source based on the first color temperature estimation information CTEI1 and the second color temperature estimation information CTEI2 (operation S502).

Figure 13:
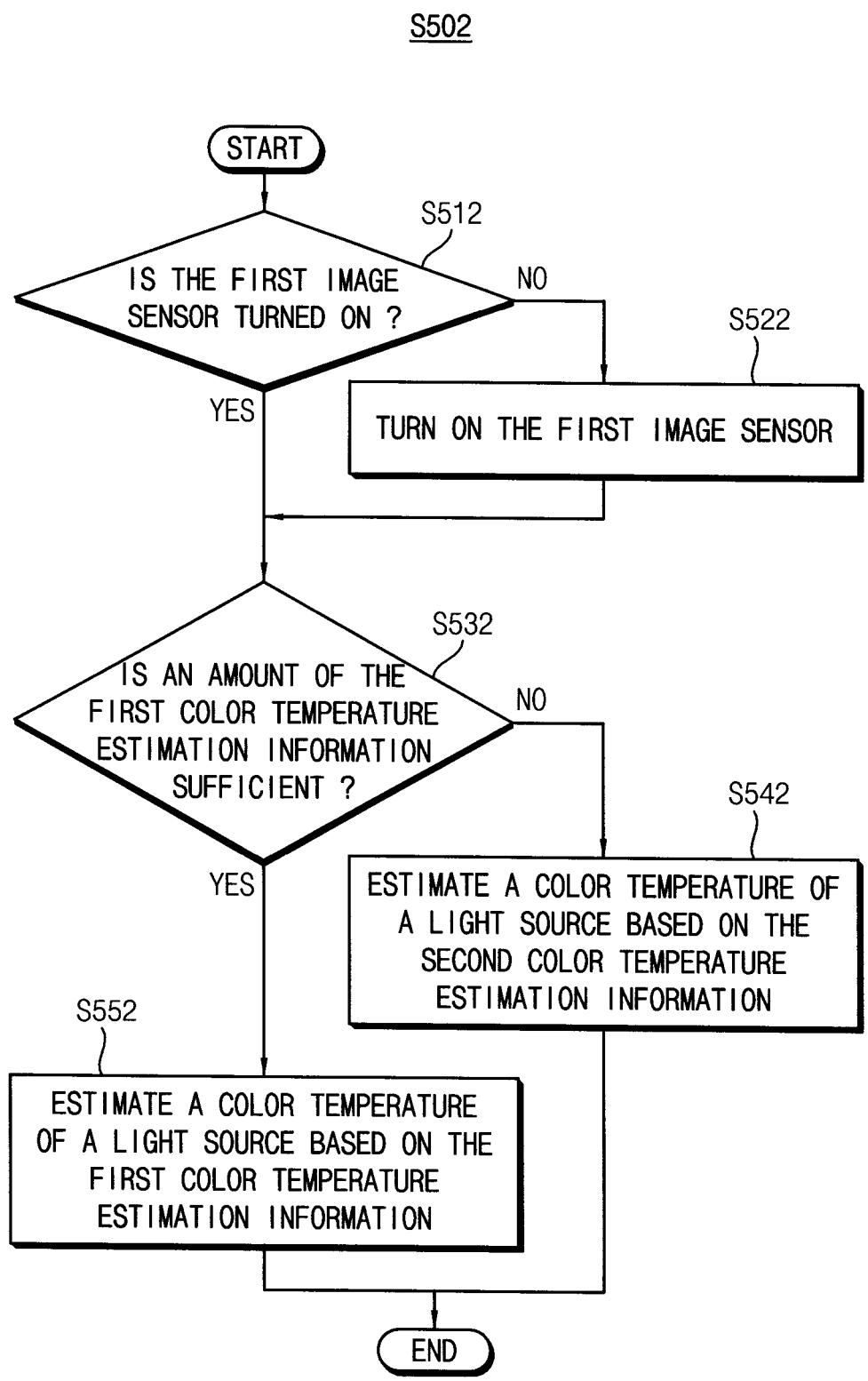
FIG. 13 is a flow chart illustrating an example of estimating a color temperature of a light source based on first color temperature estimation information and a second color temperature estimation information when an amount of the second color temperature estimation information is insufficient in FIG. 4, according to an exemplary embodiment.

FIG. 13 is a flow chart illustrating an example of estimating a color temperature of a light source based on first color temperature estimation information and a second color temperature estimation information when an amount of the second color temperature estimation information is insufficient in operation S502 of FIG. 4, according to an exemplary embodiment.

Referring to FIG. 13, when the amount of the second color temperature estimation information CTEI2 is insufficient to estimate the color temperature of the light source (FIG. 4, operation S302; NO), the second color temperature estimator 130-2 may determine whether the first image sensor 110-1 is turned on (operation S512).

When the first image sensor 110-1 is turned on (operation S512; YES), the process proceeds to operation S532. On the other hand, when the first image sensor 110-1 is turned off (operation S512; NO), the second color temperature estimator 130-2 may turn on the first image sensor 110-1 (operation S522). For example, the second color temperature estimator 130-2 may transmit a request signal for turning on the first image sensor 110-1 to the controller 300, and the controller 300 may provide the first control signal CON1 to the first image sensor 110-1 in response to the request signal to turn on the first image sensor 110-1. When the first image sensor 110-1 is turned on, the first image sensor 110-1 may generate the first frame data FD1 in response to the incident light, and the first color temperature estimation information generator 120-1 may generate the first color temperature estimation information CTEI1 based on the first frame data FD1. After the first image sensor 110-1 is turned on, the process proceeds to operation S532.

In operation S532, the second color temperature estimator 130-2 may determine whether an amount of the first color temperature estimation information CTEI1 provided from the first color temperature estimation information generator 120-1 is sufficient to estimate the color temperature of the light source (operation S532).

When the amount of the first color temperature estimation information CTEI1 is insufficient to estimate the color temperature of the light source (operation S532; NO), the second color temperature estimator 130-2 may generate the second color temperature data CTD2 by estimating the color temperature of the light source based on the second color temperature estimation information CTEI2, which is generated based on the second frame data FD2 (operation S542), since both the first color temperature estimation information CTEI1 and the second color temperature estimation information CTEI2 are insufficient to estimate the color temperature of the light source.

On the other hand, when the amount of the first color temperature estimation information CTEI1 is sufficient to estimate the color temperature of the light source (operation S532; YES), the second color temperature estimator 130-2 may generate the second color temperature data CTD2 by estimating the color temperature of the light source based on the first color temperature estimation information CTEI1 (operation S552).

A structure and an operation of the second color temperature estimator 130-2 may be the same as a structure and an operation of the first color temperature estimator 130-1. Therefore, an operation of the second color temperature estimator 130-2 for generating the second color temperature data CTD2 (operations S302, S402 and S502) may be the same as an operation of the first color temperature estimator 130-1 for generating the first color temperature data CTD1 (operations S301, S401 and S501). Since the operation of the first color temperature estimator 130-1 for generating the first color temperature data CTD1 (operations S301, S401 and S501) is described above with reference to FIGS. 4, 8, 9 and 10, a detailed description of the operation of the second color temperature estimator 130-2 for generating the second color temperature data CTD2 (operations S302, S402 and S502) will be omitted.

The first color temperature estimator 130-1 and the second color temperature estimator 130-2 may operate independently from each other. Therefore, the operation of the first color temperature estimator 130-1 for generating the first color temperature data CTD1 (operations S301, S401 and S501) and the operation of the second color temperature estimator 130-2 for generating the second color temperature data CTD2 (operations S302, S402 and S502) may be performed at the same time. Additionally, the operations may start at the same time.

Referring again to FIGS. 2 and 4, the image processor 200 may generate a first adjusted frame data AFD1, which corresponds to an AWB calibrated version of the first frame data FD1 that is provided from the first image sensor 110-1, by adjusting the first frame data FD1 based on the first color temperature data CTD1 provided from the first color temperature estimator 130-1 (operation S601).

For example, the image processor 200 may calculate a red gain, a green gain and a blue gain, which are applied to red pixel data, green pixel data and blue pixel data included in the first frame data FD1, based on the first color temperature data CTD1. After that, the image processor 200 may generate the first adjusted frame data AFD1 by multiplying the red gain, the green gain and the blue gain to the red pixel data, the green pixel data and the blue pixel data, respectively, included in the first frame data FD1.

In some exemplary embodiments, the image processor 200 may determine a ratio of a sum of the red average value and the blue average value to the red average value (i.e., Ravg+Bavg/Ravg) in the first color temperature data CTD1 as the red gain, determine a ratio of a sum of the red average value and the blue average value to the blue average value (i.e., Ravg+Bavg/Bavg) in the first color temperature data CTD1 as the blue gain, and determine a unit gain as the green gain.

In addition, the image processor 200 may generate a second adjusted frame data AFD2, which corresponds to an AWB calibrated version of the second frame data FD2 that is provided from the second image sensor 110-2, by adjusting the second frame data FD2 based on the second color temperature data CTD2 provided from the second color temperature estimator 130-2 (operation S602). The method of generating the second adjusted frame data AFD2 by adjusting the second frame data FD2 based on the second color temperature data CTD2 is substantially the same as the method of generating the first adjusted frame data AFD1 by adjusting the first frame data FD1 based on the first color temperature data CTD1.

The image processor 200 may perform the operation of generating the first adjusted frame data AFD1 by adjusting the first frame data FD1 and the operation of generating the second adjusted frame data AFD2 by adjusting the second frame data FD2 at the same time. Additionally, the operations may start at the same time.

In some exemplary embodiments, as illustrated in FIG. 3, the image capturing device 10b may include the first image processor 200-1 and the second image processor 200-2, which process data from the first image sensor 100-1 and the second image sensor 100-2, respectively, instead of a common image processor. In this case, the first image processor 200-1 may generate the first adjusted frame data AFD1 by adjusting the first frame data FD1 based on the first color temperature data CTD1 (operation S601), and the second image processor 200-2 may generate the second adjusted frame data AFD2 by adjusting the second frame data FD2 based on the second color temperature data CTD2 (operation S602).

As described above with reference to FIGS. 1 to 13, in the method of calibrating AWB in the image capturing device 10, the first through n-th frame data FD1, FD2, . . . , FDn may be generated by the first through n-th image sensors 100-1, 100-2, . . . , 100-n, respectively, in response to the incident light while the first through n-th image sensors 100-1, 100-2, . . . , 100-n are turned on, respectively, and the first through n-th color temperature estimation information CTEI1, CTEI2, . . . , CTEIn may be generated based on the first through n-th frame data FD1, FD2, . . . , FDn, respectively. At least one color temperature estimation information among the first through n-th color temperature estimation information CTEI1, CTEI2, . . . , CTEIn may be selected based on whether an amount of each of the first through n-th color temperature estimation information CTEI1, CTEI2, . . . , CTEIn is sufficient to estimate the color temperature of the light source, and the color temperature of the light source may be estimated based on the selected at least one color temperature estimation information. Therefore, the method of calibrating AWB according to exemplary embodiments may increase performance of the AWB calibration by increasing an accuracy of the estimation of the color temperature of the light source.

Figure 14:
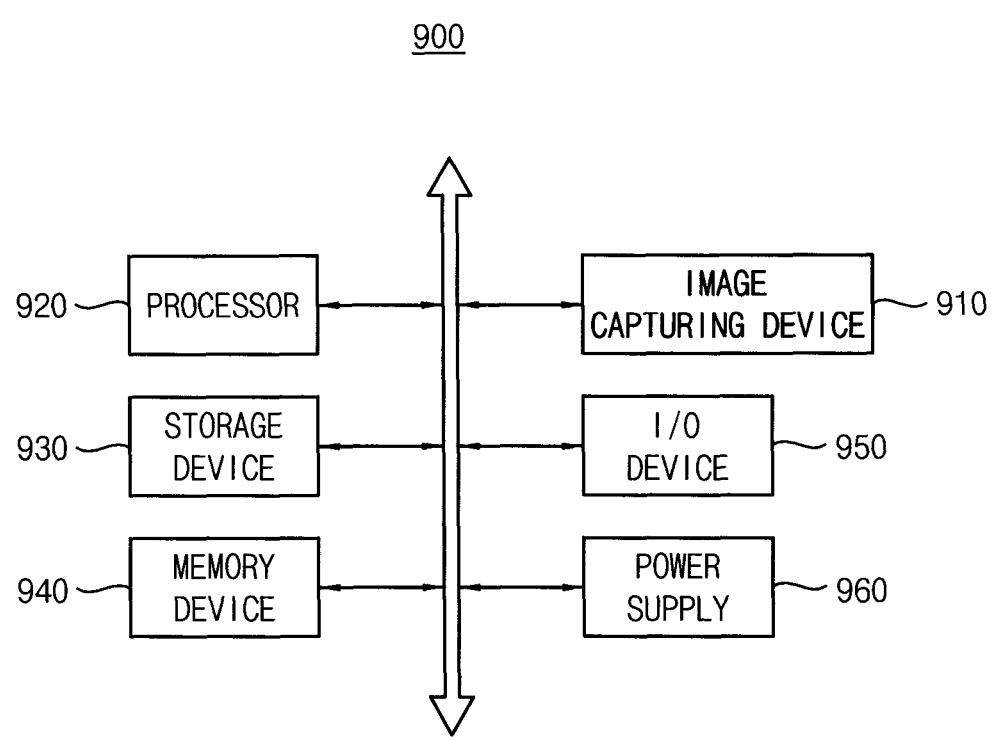
FIG. 14 is a block diagram illustrating an electronic system according to an exemplary embodiment.
Figure 15:
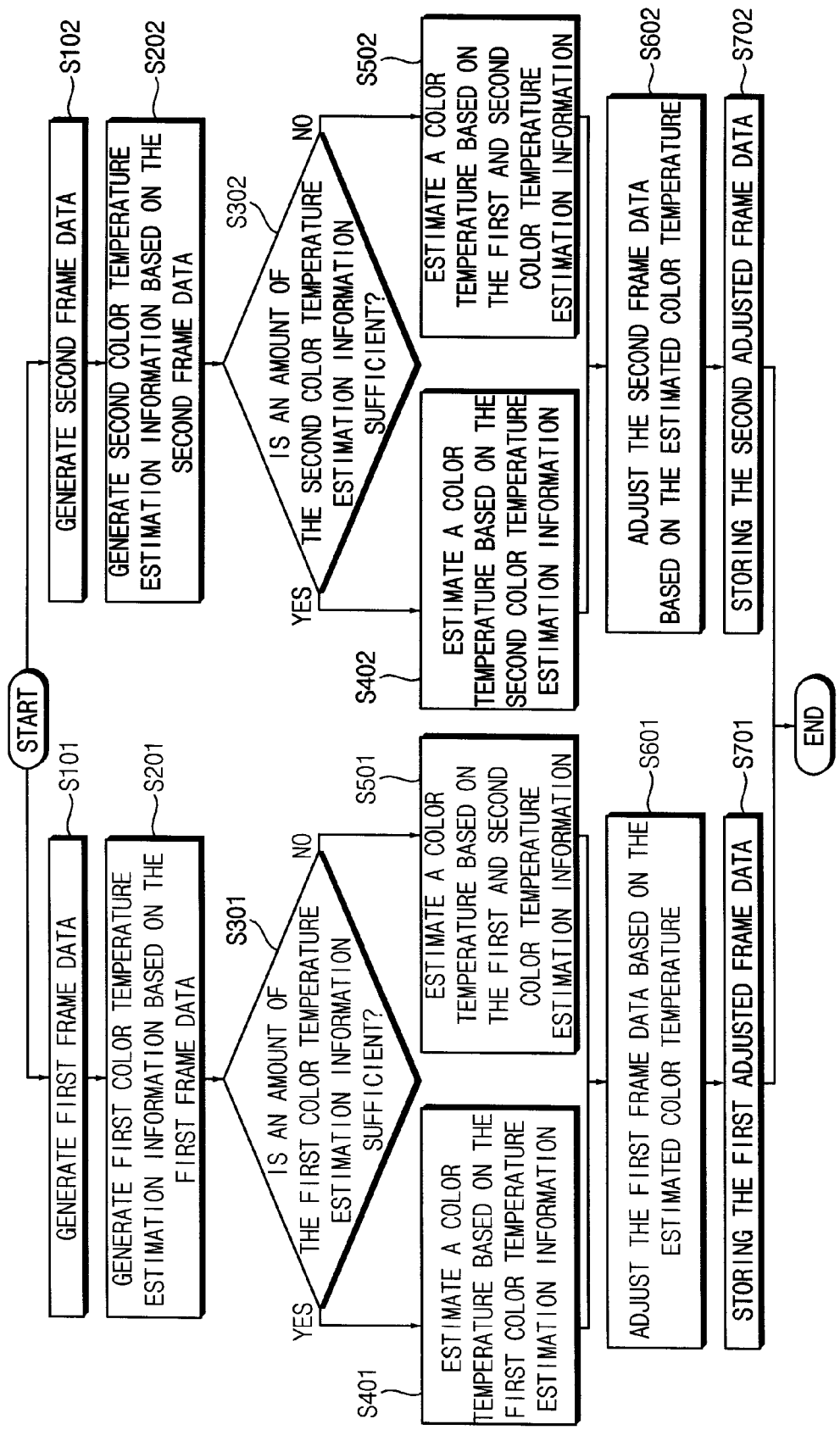
FIG. 15 is a flow chart illustrating a method of capturing image in an electronic system according to some exemplary embodiments.

FIG. 14 is a block diagram illustrating an electronic system according to an exemplary embodiment, and FIG. 15 is a flow chart illustrating a method of capturing an image in an electronic system according to exemplary embodiments.

The method of capturing image in FIG. 15 may be performed by the electronic system of FIG. 14.

Referring to FIGS. 14 and 15, an electronic system 900 includes an image capturing device 910, a processor 920 and a storage device 930.

The image capturing device 910 includes a plurality of image sensors including a first image sensor and a second image sensor.

The image capturing device 910 generates a first frame data using the first image sensor in response to incident light while the first image sensor is turned on (operation S101), and generates a second frame data using the second image sensor in response to the incident light while the second image sensor is turned on (operation S102).

When the first image sensor is turned on, the image capturing device 910 generates first color temperature estimation information, which is used to estimate a color temperature of a light source from which the incident light is originated, based on the first frame data (operation S201). When the second image sensor is turned on, the image capturing device 910 generates second color temperature estimation information, which is used to estimate the color temperature of the light source from which the incident light is originated, based on the second frame data (operation S202).

The image capturing device 910 determines whether an amount of the first color temperature estimation information is sufficient to estimate the color temperature of the light source is determined (operation S301).

When the amount of the first color temperature estimation information is sufficient to estimate the color temperature of the light source (operation S301; YES), the image capturing device 910 estimates the color temperature of the light source based on the first color temperature estimation information (operation S401).

When the amount of the first color temperature estimation information is insufficient to estimate the color temperature of the light source (operation S301; NO), the image capturing device 910 estimates the color temperature of the light source based on the first color temperature estimation information and the second color temperature estimation information (operation S501).

The image capturing device 910 generates first adjusted frame data, which corresponds to an AWB calibrated version of the first frame data, by adjusting the first frame data based on the estimated color temperature (operation S601), and stores the first adjusted frame data in the storage device 930 (operation S701).

Similarly, the image capturing device 910 determines whether an amount of the second color temperature estimation information is sufficient to estimate the color temperature of the light source is determined (operation S302).

When the amount of the second color temperature estimation information is sufficient to estimate the color temperature of the light source (operation S302; YES), the image capturing device 910 estimates the color temperature of the light source based on the second color temperature estimation information (operation S402).

When the amount of the second color temperature estimation information is insufficient to estimate the color temperature of the light source (operation S302; NO), the image capturing device 910 estimates the color temperature of the light source based on the first color temperature estimation information and the second color temperature estimation information (operation S502).

The image capturing device 910 generates second adjusted frame data, which corresponds to an AWB calibrated version of the second frame data, by adjusting the second frame data based on the estimated color temperature (operation S602), and stores the second adjusted frame data in the storage device 930 (operation S702).

The image capturing device 910 may be embodied with the image capturing device 10 of FIG. 1. A structure and an operation of the image capturing device 10 of FIG. 1 are described above with reference to FIGS. 1 to 13. Therefore, a detail description of the image capturing device 910 will be omitted.

The storage device 930 stores the first adjusted frame data and the second adjusted frame data generated from the image capturing device 910. The processor 920 controls operations of the image capturing device 910 and the storage device 930.

The electronic system 900 may further include a memory device 940, an input/output device 950 and a power supply 960. Although it is not illustrated in FIG. 14, the electronic system 900 may further include ports that communicate with a video card, a sound card, a memory card, a universal serial bus (USB) device, or other electronic devices.

The processor 920 may perform various calculations or tasks. According to some embodiments, the processor 920 may be a microprocessor or a central processing unit (CPU). The processor 920 may communicate with the storage device 930, the memory device 940 and the input/output device 950 via an address bus, a control bus, and/or a data bus. In some exemplary embodiments, the processor 920 may be coupled to an extended bus, such as a peripheral component interconnection (PCI) bus.

The storage device 930 may include a non-volatile memory device such as a flash memory device, a solid state drive (SSD), a hard disk drive (HDD), a compact disk read-only memory (CD-ROM) drive, etc.

The memory device 940 may store data for an operation of the electronic system 900. The memory device 940 may be a dynamic random access memory (DRAM), a static random access memory (SRAM), or a non-volatile memory, such as an erasable programmable read-only memory (EPROM), an electrically erasable programmable read-only memory (EEPROM), a flash memory, etc.

The input/output device 950 may include a touch screen, a keypad, a keyboard, a mouse, a printer, etc. The power supply 960 may supply operational power.

The image capturing device 910 may be connected to the processor 920 through one or more of the above buses or other communication links to communicate with the processor 920.

The electronic system 900 may be any electronic system using an image capturing device. For example, the electronic system 900 may include a digital camera, a mobile phone, a smart phone, a portable multimedia player (PMP), a personal digital assistant (PDA), etc.

Figure 16:
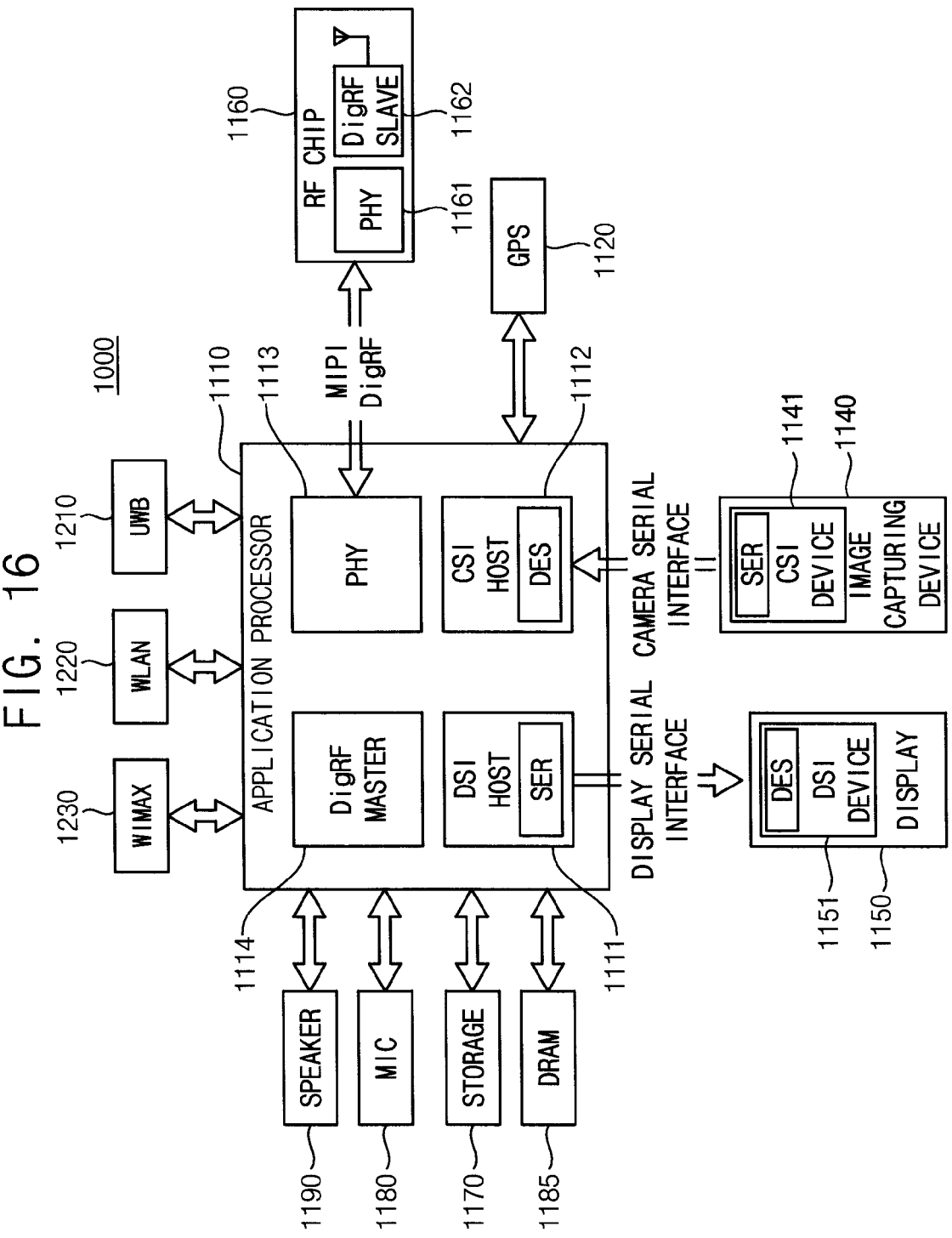
FIG. 16 is a block diagram illustrating an example of an interface used in the electronic system of FIG. 14.

FIG. 16 is a block diagram illustrating an example of an interface used in the electronic system of FIG. 14.

Referring to FIG. 16, an electronic system 1000 may be implemented by a data processing device (e.g., a cellular phone, a personal digital assistant, a portable multimedia player, a smart phone, etc.) that uses or supports a mobile industry processor interface (MIPI) interface. The electronic system 1000 may include an application processor 1110, an image capturing device 1140, a display device 1150, etc.

A CSI host 1112 of the application processor 1110 may perform a serial communication with a CSI device 1141 of the image capturing device 1140 via a camera serial interface (CSI). In some embodiments, the CSI host 1112 may include a deserializer (DES), and the CSI device 1141 may include a serializer (SER). A DSI host 1111 of the application processor 1110 may perform a serial communication with a DSI device 1151 of the display device 1150 via a display serial interface (DSI). In some exemplary embodiments, the DSI host 1111 may include a serializer (SER), and the DSI device 1151 may include a deserializer (DES).

The electronic system 1000 may further include a radio frequency (RF) chip 1160 performing a communication with the application processor 1110. A physical layer (PHY) 1113 of the electronic system 1000 and a physical layer (PHY) 1161 of the RF chip 1160 may perform data communications based on a MIPI DigRF. The application processor 1110 may further include a DigRF MASTER 1114 that controls the data communications according to the MIPI DigRF of the PHY 1161, and the RF chip 1160 may further include a DigRF SLAVE 1162 controlled by the DigRF MASTER 1114.

The electronic system 1000 may further include a global positioning system (GPS) 1120, a storage 1170, a MIC 1180, a DRAM device 1185, and a speaker 1190. In addition, the electronic system 1000 may perform communications using an ultra wideband (UWB) 1210, a wireless local area network (WLAN) 1220, a worldwide interoperability for microwave access (WIMAX) 1230, etc. However, the structure and the interface of the electronic system 1000 are not limited thereto.

The foregoing is illustrative of the present inventive concept and is not to be construed as limiting thereof. Although a few exemplary embodiments have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A method of calibrating automatic white balance in an image capturing device including a first image sensor and a second image sensor, the method comprising:
    generating first frame data and second frame data using the first image sensor and the second image sensor, respectively, in response to incident light while the first image sensor and the second image sensor are turned on;
    generating first color temperature estimation information and second color temperature estimation information based on the first frame data and the second frame data, respectively;

determining whether an amount of the first color temperature estimation information is sufficient to estimate a color temperature of a light source;
estimating the color temperature of the light source based on the first color temperature estimation information in response to determining that the amount of the first color temperature estimation information is sufficient;
estimating the color temperature of the light source based on the first color temperature estimation information and the second color temperature estimation information in response to determining that the amount of the first color temperature estimation information is insufficient; and
adjusting the first frame data based on the estimated color temperature.

2. The method of claim 1, wherein the estimating the color temperature of the light source based on the first color temperature estimation information and the second color temperature estimation information in response to determining that the amount of the first color temperature estimation information is insufficient comprises:
determining whether the second image sensor is turned on; and
turning on the second image sensor in response to determining that the second image sensor is turned off.

3. The method of claim 2, wherein the estimating the color temperature of the light source based on the first color temperature estimation information and the second color temperature estimation information in response to determining that the amount of the first color temperature estimation information is insufficient further comprises:
determining whether an amount of the second color temperature estimation information is sufficient to estimate the color temperature of the light source;
estimating the color temperature of the light source based on the second color temperature estimation information in response to determining that the amount of the second color temperature estimation information is sufficient; and
estimating the color temperature of the light source based on the first color temperature estimation information in response to determining that the amount of the second color temperature estimation information is insufficient.

4. The method of claim 1, wherein the estimating the color temperature of the light source based on the first color temperature estimation information in response to determining that the amount of the first color temperature estimation information is sufficient comprises:
determining whether the second image sensor is turned on; and
estimating the color temperature of the light source based on the first color temperature estimation information in response to determining that the second image sensor is turned off.

5. The method of claim 4, wherein the estimating the color temperature of the light source based on the first color temperature estimation information in response to determining that the amount of the first color temperature estimation information is sufficient further comprises:
determining whether an amount of the second color temperature estimation information is sufficient to estimate the color temperature of the light source in response to determining that the second image sensor is turned on;
estimating the color temperature of the light source based on the first color temperature estimation information and the second color temperature estimation information in response to determining that the amount of the second color temperature estimation information is sufficient; and
estimating the color temperature of the light source based on the first color temperature estimation information in response to determining the amount of the second color temperature estimation information is insufficient.

6. The method of claim 5, wherein the estimating the color temperature of the light source based on the first color temperature estimation information and the second color temperature estimation information in response to determining that the amount of the second color temperature estimation information is sufficient comprises:
generating a first color temperature estimation value by estimating the color temperature of the light source based on the first color temperature estimation information;
generating a second color temperature estimation value by estimating the color temperature of the light source based on the second color temperature estimation information; and
estimating the color temperature of the light source based on the first color temperature estimation value and the second color temperature estimation value.

7. The method of claim 6, wherein the estimating the color temperature of the light source based on the first color temperature estimation value and the second color temperature estimation value comprises:
generating a first weight value and a second weight value that are proportional to the amount of the first color temperature estimation information and the amount of the second color temperature estimation information, respectively;
calculating a weighted average value of the first color temperature estimation value and the second color temperature estimation value using the first weight value and the second weight value; and
estimating the color temperature of the light source based on the weighted average value.

8. The method of claim 6, wherein the estimating the color temperature of the light source based on the first color temperature estimation value and the second color temperature estimation value comprises:
estimating the color temperature of the light source based on the first color temperature estimation value in response to a difference between the first color temperature estimation value and the second color temperature estimation value being greater than a threshold value.

9. The method of claim 1, wherein the generating the first color temperature estimation information based on the first frame data comprises:
dividing a frame area corresponding to the first frame data into a plurality of sub-areas;
generating a pair of a first average value and a second average value for each of the plurality of sub-areas, the first average value corresponding to an average of red pixel data included in a respective sub-area, the second average value corresponding to an average of blue pixel data included in the respective sub-area; and
determining pairs that are included in a predetermined range from among the generated pairs as the first color temperature estimation information.

10. The method of claim 9, wherein the determining whether the amount of the first color temperature estimation information is sufficient to estimate the color temperature of the light source comprises:

determining whether a ratio of a number of the determined pairs to a total number of the plurality of sub-areas is greater than a threshold ratio.

11. The method of claim 10, wherein the estimating the color temperature of the light source based on the first color temperature estimation information in response to determining that the amount of the first color temperature estimation information is sufficient comprises:

calculating a red average value, which corresponds to an arithmetic average of the first average values included in the first color temperature estimation information, and a blue average value, which corresponds to an arithmetic average of the second average values included in the first color temperature estimation information; and outputting a pair of the red average value and the blue average value as color temperature data corresponding to the estimated color temperature.

12. The method of claim 11, wherein the adjusting the first frame data based on the estimated color temperature comprises:

calculating a red gain, a green gain and a blue gain based on the color temperature data; and generating adjusted frame data by multiplying the red gain, the green gain and the blue gain by red pixel data, green pixel data and blue pixel data, respectively, included in the first frame data.

13. The method of claim 12, wherein the generating the red gain, the green gain and the blue gain based on the color temperature data comprises:

determining a ratio of a sum of the red average value and the blue average value to the red average value as the red gain;

determining a ratio of a sum of the red average value and the blue average value to the blue average value as the blue gain; and determining a unit gain as the green gain.

14. A method of generating adjusted frame data in an electronic system including a first image sensor, a second image sensor and a storage device, the method comprising:

generating first frame data and second frame data using the first image sensor and the second image sensor, respectively, in response to incident light while the first image sensor and the second image sensor are turned on;

generating first color temperature estimation information and second color temperature estimation information based on the first frame data and the second frame data, respectively;

determining whether an amount of the first color temperature estimation information is sufficient to estimate a color temperature of a light source;

estimating the color temperature of the light source based on the first color temperature estimation information in response to determining that the amount of the first color temperature estimation information is sufficient;

estimating the color temperature of the light source based on the first color temperature estimation information and the second color temperature estimation information in response to determining that the amount of the first color temperature estimation information is insufficient;

generating adjusted frame data by adjusting the first frame data based on the estimated color temperature; and storing the adjusted frame data in the storage device.

15. An image capture device comprising:

a first image sensor configured to, in response to a first control signal, turn on and generate first frame data, generate first color temperature estimation information based on the generated first frame data, and determine whether an amount of the first color temperature estimation information is sufficient to estimate a color temperature of a light source;

a second image sensor configured to, in response to a second control signal, turn on and generate second frame data, and generate second color temperature estimation information from the generated second frame data;

an image processor configured to receive first color temperature data from the first image sensor and adjust the first frame data according to the first color temperature data; and a controller configured to generate the first control signal and the second control signal, wherein the first image sensor is further configured to, in response to determining that the amount of the first color temperature estimation information is sufficient, generate the first color temperature data by estimating the first color temperature of the light source based on the first color temperature estimation information, and in response to determining that the amount of the first color temperature estimation information is insufficient, generate the first color temperature data by estimating the first color temperature of the light source based on the first color temperature estimation information and the second color temperature estimation information.

16. The image capture device of claim 15, wherein:

the second image sensor is further configured to determine whether an amount of the second color temperature estimation information is sufficient to estimate a color temperature of the light source, the second image sensor is further configured to, in response to determining that the amount of the second color temperature estimation information is sufficient, generate second color temperature data by estimating the second color temperature of the light source based on the second color temperature estimation information, and in response to determining that the amount of the second color temperature estimation information is insufficient, generate the second color temperature data by estimating the second color temperature of the light source based on the first color temperature estimation information and the second color temperature estimation information, and the image processor is further configured to receive the second color temperature data from the second image sensor and adjust the second frame data according to the second color temperature data.

17. The image capture device of claim 16, wherein the image processor comprises a first image processor and a second image processor corresponding to the first image sensor and the second image sensor, respectively, and wherein the first image processor is configured to receive the first color temperature data from the first image sensor and adjust the first frame data according to the first color temperature data, and wherein the second image processor is configured to receive the second color temperature data from the second image sensor and adjust the second frame data according to the second color temperature data.

18. The image capture device of claim 15, wherein the first image sensor is further configured to, in response to determining that the amount of the first color temperature estimation information is sufficient, generate the first color temperature data by estimating the first color temperature of the light source based on only the first color temperature estimation information, and in response to determining that the amount of the first color temperature estimation information is insufficient, generate the first color temperature data by estimating the first color temperature of the light source based on both the first color temperature estimation information and the second color temperature estimation information.

19. The image capture device of claim 16, wherein the second image sensor is further configured to, in response to determining that the amount of the second color temperature estimation information is sufficient, generate the second color temperature data by estimating the second color temperature of the light source based on only the second color temperature estimation information, and in response to determining that the amount of the second color temperature estimation information is insufficient, generate the second color temperature data by estimating the second color temperature of the light source based on both the first color temperature estimation information and the second color temperature estimation information.

20. The image capture device of claim 16, wherein the first image sensor is further configured to, in response to determining that the amount of the first color temperature estimation information is sufficient, the first image sensor generates the first color temperature data by estimating the first color temperature of the light source based on only the first color temperature estimation information, and in response to determining that the amount of the first color temperature estimation information is insufficient, generates the first color temperature data by estimating the first color temperature of the light source based on both the first color temperature estimation information and the second color temperature estimation information, and wherein the second image sensor is further configured to, in response to determining that the amount of the second color temperature estimation information is sufficient, generate the second color temperature data by estimating the second color temperature of the light source based on only the second color temperature estimation information, and in response to determining that the amount of the second color temperature estimation information is insufficient, generate the second color temperature data by estimating the second color temperature of the light source based on both the first color temperature estimation information and the second color temperature estimation information.

\* \* \* \* \*